(12) United States Patent
Karmon et al.

(10) Patent No.: US 10,310,618 B2
(45) Date of Patent: *Jun. 4, 2019

(54) GESTURES VISUAL BUILDER TOOL

(71) Applicant: Microsoft Technology Licensing, LLC, Redmond, WA (US)

(72) Inventors: Kfir Karmon, Petach-Tikva (IL); Eyal Krupka, Shimshit (IL); Yuval Tzairi, Haifa (IL); Uri Levanon, Tel-Aviv (IL); Shelly Horowitz, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/985,775

(22) Filed: Dec. 31, 2015

(65) Prior Publication Data

US 2017/0192514 A1 Jul. 6, 2017

(51) Int. Cl.
*G06F 3/0482* (2013.01)
*G06F 3/01* (2006.01)
(Continued)

(52) U.S. Cl.
CPC ............ *G06F 3/017* (2013.01); *G06F 3/0304* (2013.01); *G06F 3/0482* (2013.01); *G06F 8/34* (2013.01);
(Continued)

(58) Field of Classification Search
CPC .......... G06F 3/017; G06F 8/34; G06F 3/0304; G06F 3/0482; G06F 3/048; G06K 9/00375; G06K 9/00362; G06K 9/00355
See application file for complete search history.

(56) References Cited

U.S. PATENT DOCUMENTS

| 6,252,598 B1 | 6/2001 | Segen |
| 8,013,890 B2 | 9/2011 | Ohtake et al. |

(Continued)

FOREIGN PATENT DOCUMENTS

WO 2014113454 A1 7/2014

OTHER PUBLICATIONS

Martin, John C., Introduction to languages and theory of computation, 2011, McGraw Hill, Fourth Edition, pp. 45-76.*

(Continued)

*Primary Examiner* — Jeanette J Parker

(57) ABSTRACT

A system for creating hand gestures representations, comprising an interface for interacting with a user, a storage storing a plurality of discrete pose values and discrete motion values, a memory storing a gesture visual builder code, one or more processors coupled to the interface, storage and memory to execute the gesture visual builder code allowing the user to create hand gesture. The gesture visual builder code comprising code instructions to present the user with a GUI which displays a hierarchical menu driven interface, code instructions to receive iteratively user instructions from the user using the hierarchical menu driven interface, for creating a logical sequence of hand gesture by defining one or more hand pose features records and hand motion features records and code instructions to generate a code segment defining the one or more hand pose/motion features records through the discrete pose/motion values respectively.

25 Claims, 13 Drawing Sheets

(51) Int. Cl.
  *G06F 8/34* (2018.01)
  *G06F 3/03* (2006.01)
  *G06K 9/00* (2006.01)
  *G06K 9/46* (2006.01)

(52) U.S. Cl.
  CPC ..... *G06K 9/00355* (2013.01); *G06K 9/00382* (2013.01); *G06K 9/00389* (2013.01); *G06K 9/46* (2013.01)

(56) References Cited

U.S. PATENT DOCUMENTS

| | | | |
|---|---|---|---|
| 8,631,317 B2 | 1/2014 | Kangas et al. | |
| 9,207,771 B2 | 12/2015 | Antoniac | |
| 9,430,140 B2 | 8/2016 | Reuschel et al. | |
| 9,454,225 B2 | 9/2016 | Bychkov et al. | |
| 9,468,848 B2 | 10/2016 | Murillo et al. | |
| 9,767,616 B2 | 9/2017 | Miller | |
| 2002/0089541 A1 | 7/2002 | Orbanes et al. | |
| 2009/0278915 A1 | 11/2009 | Kramer et al. | |
| 2010/0050133 A1 | 2/2010 | Nishihara et al. | |
| 2010/0066676 A1 | 3/2010 | Kramer et al. | |
| 2010/0194762 A1* | 8/2010 | Latta | G06F 3/017 345/473 |
| 2010/0281435 A1* | 11/2010 | Bangalore | G06F 3/038 715/863 |
| 2011/0234840 A1 | 9/2011 | Klefenz et al. | |
| 2012/0036434 A1* | 2/2012 | Oberstein | G06F 3/0482 715/702 |
| 2012/0092286 A1 | 4/2012 | O'prey et al. | |
| 2012/0324332 A1* | 12/2012 | Zaragoza | G06F 9/4443 715/234 |
| 2013/0019206 A1* | 1/2013 | Kotler | G06F 3/04812 715/834 |
| 2013/0227418 A1* | 8/2013 | Sa | G06F 3/0488 715/728 |
| 2013/0336524 A1 | 12/2013 | Zhang et al. | |
| 2014/0109023 A1* | 4/2014 | Murillo | G06F 3/017 715/863 |
| 2014/0129935 A1 | 5/2014 | Ovadia Nahon et al. | |
| 2014/0130090 A1 | 5/2014 | Krikorian | |
| 2014/0173563 A1 | 6/2014 | Dias et al. | |
| 2014/0229858 A1 | 8/2014 | Bleker et al. | |
| 2014/0298268 A1* | 10/2014 | Kang | G06F 3/04847 715/841 |
| 2015/0007130 A1 | 1/2015 | McConville et al. | |
| 2015/0029092 A1 | 1/2015 | Holz et al. | |
| 2015/0084859 A1 | 3/2015 | Itzhaik | |
| 2015/0140934 A1* | 5/2015 | Abdurrahman | H04W 4/70 455/41.2 |
| 2015/0205364 A1 | 7/2015 | Underkoffler et al. | |
| 2015/0309579 A1 | 10/2015 | Wang et al. | |
| 2016/0096072 A1 | 4/2016 | Rahman et al. | |
| 2016/0109954 A1 | 4/2016 | Harris et al. | |
| 2016/0162022 A1* | 6/2016 | Seth | G06F 3/017 345/156 |
| 2016/0357519 A1* | 12/2016 | Vargas | G06F 9/451 |
| 2017/0003749 A1* | 1/2017 | Anglin | G06F 3/017 |
| 2018/0032144 A1 | 2/2018 | Horowitz et al. | |

OTHER PUBLICATIONS

International Search Report and the Written Opinion dated Apr. 6, 2017 From the International Searching Authority Re. Application No. PCT/US2016/067898. (15 Pages).
"Office Action Issued in U.S. Appl. No. 14/985,691", dated Jul. 26, 2018, 11 Pages.
"Office Action Issued in U.S. Appl. No. 14/985,716", dated Jul. 3, 2017, 6 Pages.
"Office Action Issued in U.S. Appl. No. 14/985,804", dated May 5, 2017, 18 Pages.
Bourguet, Marie Luce, "A Toolkit for Creating and Testing Multimodal Interface Designs", In the Proceedings of User Interface Software & Technology, Jan. 2002, 2 Pages.
Lu, et al., "Gesture Coder-A Tool for Programming Multi-Touch Gestures by Demonstration", In the Proceedings of Human Factors in Computing Systems, May 5, 2012, 10 Pages.
"International Preliminary Report on Patentability Issued in PCT Application No. PCT/US2016/067892", dated Mar. 15, 2018, 10 Pages.
"International Search Report and Written Opinion Issued in PCT/US2016/067892", dated Mar. 22, 2017, 12 Pages.
"Second Written Opinion Issued in PCT Application No. PCT/US2016/067892", dated Sep. 20, 2017, 8 Pages.
"International Search Report and Written Opinion Issued in Patent Application No. PCT/US2016/067893", dated Mar. 23, 2017, 16 Pages.
"Second Written Opinion Issued in PCT Application No. PCT/US2016/067893", dated Sep. 20, 2017, 8 Pages.

\* cited by examiner

GESTURES VISUAL BUILDER TOOL

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (patent application Ser. No. 14/985,691), "MULTIMODAL INTERACTION USING A STATE MACHINE AND HAND GESTURES DISCRETE VALUES" (patent application Ser. No. 14/985,716), "RECOGNITION OF HAND POSES BY CLASSIFICATION USING DISCRETE VALUES" (U.S. Pat. No. 9,734,435), "TRANSFORM LIGHTWEIGHT SKELETON AND USING INVERSE KINEMATICS TO PRODUCE ARTICULATE SKELETON" (patent application Ser. No. 14/985,777), "STRUCTURE AND TRAINING FOR IMAGE CLASSIFICATION" (patent application Ser. No. 14/985,803), "TRANSLATION OF GESTURE TO GESTURE CODE DESCRIPTION USING DEPTH CAMERA" (patent application Ser. No. 14/985,804), "ELECTRICAL DEVICE FOR HAND GESTURES DETECTION" (U.S. Pat. No. 9,857,881) and "DETECTION OF HAND GESTURES USING GESTURE LANGUAGE DISCRETE VALUES" (patent application Ser. No. 14/985,680), the disclosures of which are incorporated herein by reference.

BACKGROUND

The growing use of hand gestures as a human machine interface (HMI) for interactive systems presents major challenges in formulating a simple, user friendly and easy to implement gesture construction and/or recognition systems. Unlike traditional HMI interface such as, for example, a keyboard, a touchscreen, a digital surface and/or pointing devices such as mouse and the likes, gesture interaction is a 3D interface in which the hand gestures are performed by a user in the space in front of the machine. The spatial characteristics and the visual nature of the hand gestures forces the tools, for example, an integrated development environment (IDE) used to create the hand gestures of the gestures HMI to employ complex interfaces since each hand gesture is defines by multiple features (characteristics). Moreover, different users may perform the interaction hand gestures different from each other making the implementation of a unified, common gesture HMI even harder. Gesture creation tools currently available may employ a user interface allowing a programmer to define the features of a hand gesture, an imaging device(s) through which the programmer may articulate a hand gesture and record it and/or a touch screen and/or a digital surface for the programmer to draw the hand gesture. However current gesture creation tools are highly complex for the programmer making the implementation of the gesture HMI difficult and time consuming. Furthermore, the created gesture HMI may fail to encompass the variety in hand gestures as performed by the different users of the gesture HMI thus failing to provide a reliable HMI.

SUMMARY

According to some embodiments of the present disclosure, there are provided systems, methods and tools for creating one or more hand gestures to be used by a gesture HMI to interact with a computerized machine, for example, a computer, a laptop, a smartphone, a tablet and/or any other processor based machine or appliance which integrates and/or is attached to an imaging device(s), for example, camera(s), depth camera(s), stereo camera(s), infrared (IR) camera(s) and the likes, which monitors a user's hand movement. Definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s). Creation of the hand gestures is done using a gestures visual builder tool which provides a programmer a platform and/or environment, for example, a graphic user interface (GUI) based IDE. The gestures visual builder tool enables the programmer to create the one or more hand gestures using an innovative, simple and highly intuitive hierarchical menu based interface. The gestures visual builder tool takes advantage of a simple gesture language in which a finite number of discrete pose and motion values building block are used to define each hand pose and/or motion respectively. The gestures visual builder tool generates a software code segment in the form of code instructions and/or a data representation for the created hand gesture such as, for example, java-script object notation (JSON), extensible application markup language (XAML), and/or extensible markup language (XML). The gestures visual builder tool may be coupled with a gesture library and/or a gesture application programming interface (API) to allow the programmer a straight forward distribution path for sharing and/or hooking the created one or more hand gestures to one or more functions of one or more applications to employ the gesture HMI.

Each of the hand gestures is defined by a gesture dataset of discrete values describing the features (characteristics) of the hand gesture, for example, hand pose, hand and/or fingers spatial location, fingers relative location to one another, fingers tangency, hand and/or fingers motion outline and/or motion characteristics. The gesture dataset documents one or more hand poses and/or hand motions wherein each of the one or more hand poses and/or hand motions is defined by a features record of discrete values of the hand features. The gesture dataset optionally defines one or more sequences and/or finite state machines (FSM) documenting transitions between hand pose(s) and/or hand motion(s). The discrete nature of the gesture allows each hand pose and/or hand motion to be easily constructed by a representation of a finite number features. In addition the discrete values implementation may greatly reduce the sensitivity to gesture variance among a plurality of users since each of the hand gestures is brought down to a minimal representation. Furthermore, the minimal representation of the discrete implementation may simplify recognition, identification and/or classification of the hand gestures in runtime, avoiding the use of machine learning and intensive computer vision processing.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
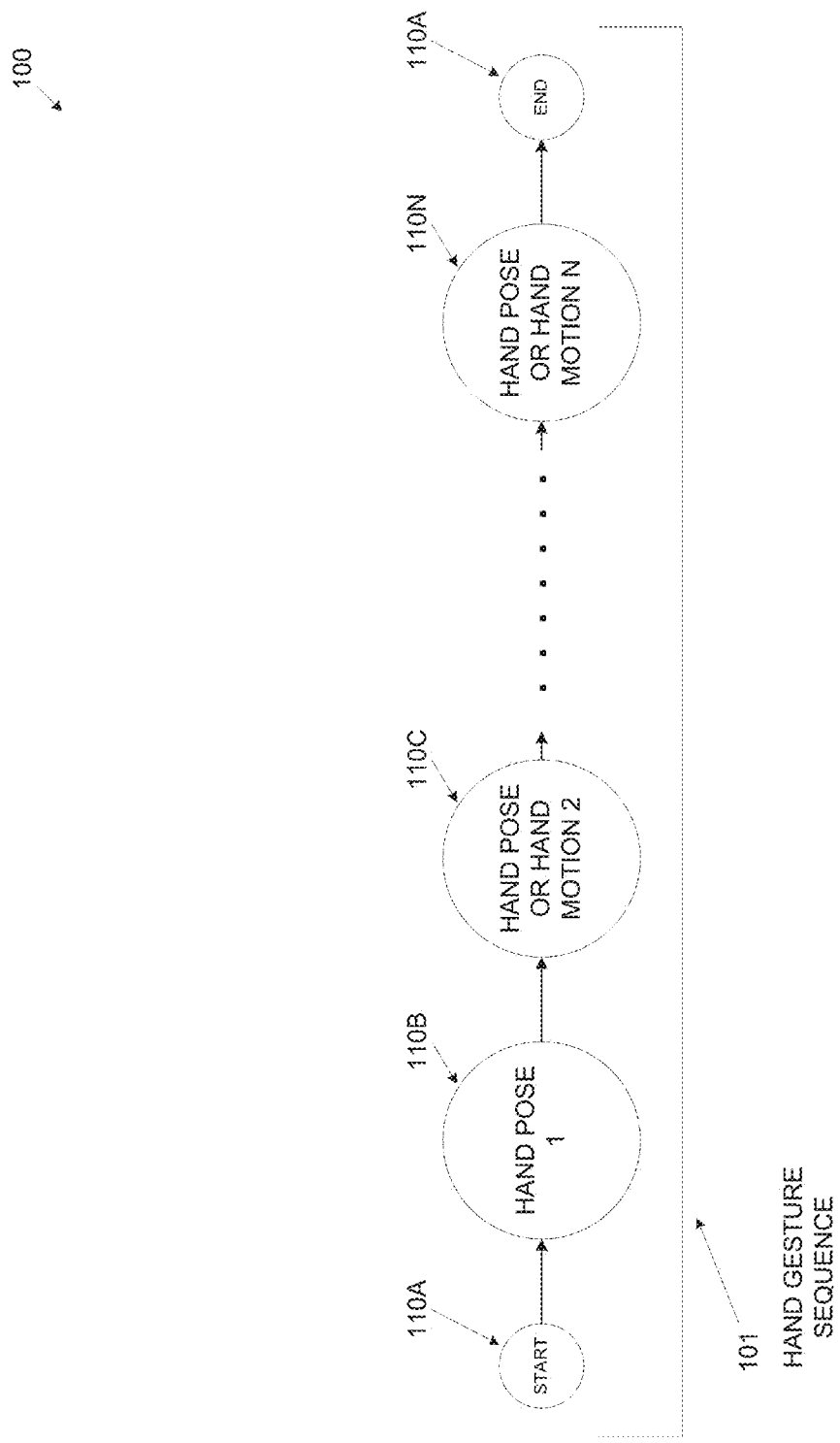
FIG. 1 is a schematic illustration of exemplary hand gesture sequence as presented by an exemplary visual gesture builder, according to some embodiments of the present disclosure.

According to some embodiments of the present disclosure, there are provided systems, methods and tools for creating one or more hand gestures to be used by a gesture HMI to interact with a computerized machine which integrates and/or is attached to an imaging device(s) which monitors a user's hand movement. A programmer may create one or more hand gestures using a gestures visual builder tool which provides the programmer a platform and/or environment, for example, a GUI based IDE. The gestures visual builder tool IDE may be executed on one or more processors as, for example, a local application(s), a web service accessible for example using a web browser, a remote service provided by remote one or more servers and/or a web robot (bot) connection. The interface unit includes an input device, for example, keyboard, touch-screen, a digital surface and/or pointing device such as, for example, a mouse and an output device, for example a monitor, a projector and/or a screen. A hand gesture may refer to one or more hand poses and/or hand motions performed by a single hand and/or of both hands (right and left). Each hand is assigned a dedicated instance of the dataset of poses and/or motions features so that the one or more hand gestures of each hand may be separately constructed, classified and/or identified. However for brevity, reference hereinafter is made to hand gesture to address hand gestures of one and/or both hands. The gestures visual builder tool incorporates a hierarchical menu driven interface allowing the programmer to easily navigate and create the one or more hand gestures by building a logical sequence of one or more hand poses and/or hand motions associated with each of the hand gestures. The hand poses and hand motions are each defined by the programmer using the gestures visual builder tool through a hand pose features record and a hand motion features record respectively. The hand poses and motions features records may be implemented through, for example, a features vector, a features matrix and/or a features table. The hand pose features record is a dataset of discreet pose values selected by the programmer to define a respective hand pose where each of the discrete pose values is indicative of a respective hand pose feature (characteristic), for example, hand selection, hand position, hand spatial location, fingers flexion (per finger), fingers direction (per finger), fingers tangency (per two or more fingers) and/or fingers relative location (per two or more fingers). The hand motion features record is a dataset of discreet motion values selected by the programmer to define a respective hand motion where each of the discrete motion values is indicative of a respective hand motion feature (characteristic), for example, motion properties (size, speed, direction and/or location) and/or motion outline which may be defined by a motion script. Continuous values of the one or more hand pose features and/or hand motion features may be represented by discrete hand values by quantizing the continuous values to support the discrete architecture for creating the one or more hand gestures. The gestures visual builder tool translates the hand poses and/or hand motions as defined by the programmer to a code segment which includes the one or more logical sequences associated with the one or more hand gestures. The code segment may be generated in the form of code instructions and/or a data representation for the created hand gesture such as, for example, JSON, XAML, and/or XML. Each of the one or more hand gestures logical sequences may be represented, for example by a unique FSM. The code segment may use one or more gesture libraries to construct one or more hand poses and/or hand motions constituting the logical sequence of each hand gesture. The code segment may be incorporated into one or more applications to make use of the hand gestures for interacting with one or more users, for example, as HMI. Optionally the code segment follows a gesture API which may expose a gesture set, for example a gestures library, comprising a plurality of hand gesture though a software interface allowing the programmer to associate one or more application functions to the one or more of the hand gestures. The gestures visual builder tool hierarchical menu based interface provides the programmer an innovative, simple and highly intuitive visual user experience. Combined with the finite possibilities for creating each of the one or more hand poses and/or hand motions, the gestures visual builder tool provides a convenient, simple and yet comprehensive environment for easily creating the one or more hand gestures.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a schematic illustration of exemplary hand gesture sequence as presented by an exemplary visual gesture builder, according to some embodiments of the present disclosure. As shown at 100, an exemplary hand gesture sequence 101 is presented by an exemplary gestures visual builder tool as a sequence of one or more hand poses and/or hand motions 1 through N. The hand gesture sequence 101 starts and completes with at a virtual state 110A, for example an idle state. Each of the hand poses and/or hand motions 1 through N that is set by a programmer is assigned a visual representation designating a construction area 110 (110A through 110N) which allows the programmer to create, delete and/or edit the one or more hand poses and/or hand motions 1-N. The hand gesture sequence 101 may be edited to add, remove and/or change the order of the one or more hand poses and/or hand motions 1 through N.

Figure 2:
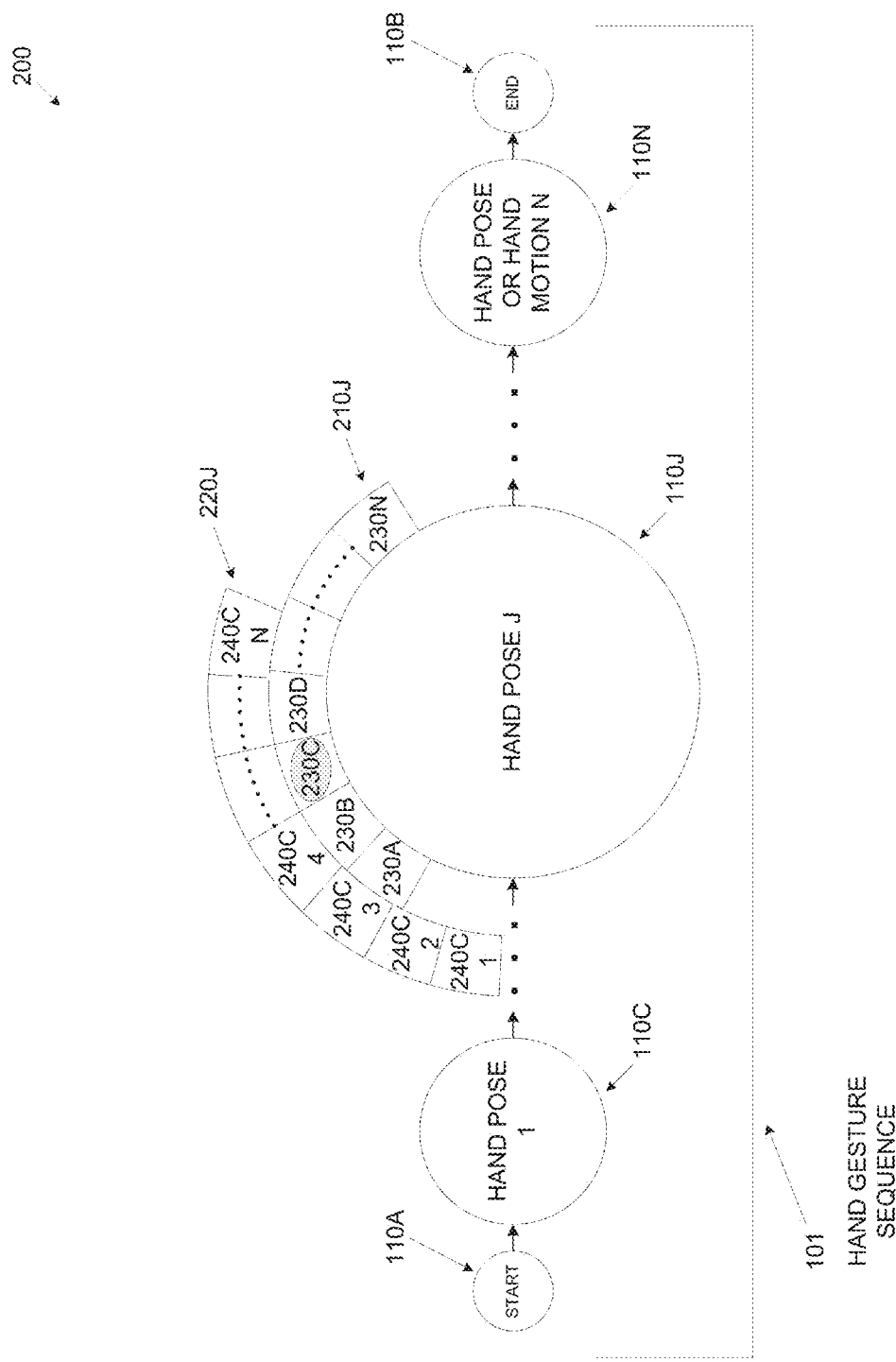
FIG. 2 is a schematic illustration of exemplary hand pose construction area using an exemplary visual gesture builder, according to some embodiments of the present disclosure.

Reference is now made to FIG. 2 which is a schematic illustration of exemplary hand pose construction area using an exemplary visual gesture builder, according to some embodiments of the present disclosure. As shown at 200, a hand gesture sequence, such as the hand gesture sequence 101 includes one or more hand poses and/or hand motions such as the hand poses and/or hand motions 1-N. A hand pose J is selected and a construction area 110J is assigned to it. The construction area 110J may present a rendered image of the hand pose J.

Once the hand pose J is selected for creating, deleting and/or editing, a hierarchical menu driven interface is presented to the programmer next to the construction area 110J. The hierarchical menu driven interface includes one or more menu 210J and sub-menu 220J. The presented hierarchical menu structure is exemplary and may include additional levels of sub-menus available to the programmer to create, delete and/or edit the hand pose J. The menu 210J includes one or more fields each associated, for example, with one of the plurality of hand pose features 230 (230A-230N) available for the hand pose J. Each of the one or more fields of the hand pose features 230 may be associated with a sub-menu 220J which presents one or more fields indicating one or more discrete pose values 240 (240A-240N) available for the associated hand pose feature of the hand pose features 230. A sub-menu 220J is opened and displayed for a hand pose feature 230C following selection of the hand pose feature 230C by the programmer. The sub-menu 220J may present a plurality of discrete pose values 240C (240C1 through 240CN) which are available for the hand pose feature 230C. Additional one or more sub-menus such as the sub-menu 220J may be displayed to present the programmer with additional optional hand pose features and/or discrete pose values available for one or more of the hand pose features and/or discrete pose values of the previous sub-menu 220J.

Optionally, the one or more menus 210J and sub-menus 220J of the hierarchical menu driven interface are implemented through arc shaped menus and sub-menus. The main menu 210J is adjacent to the construction area 110J and wraps the perimeter of the construction area 110J. Each of the one or more levels of the hierarchical menu driven interface is opened at larger radium from the center of the construction area 110J.

Optionally, the visual representation of the selected hand pose J is enlarged to allow the programmer easy visibility, navigation and/or selection.

Optionally, one or more of the hand pose features 230 which are not available for the selected hand pose J are shown as not available, for example, greyed out, indicating the programmer that the hand pose feature 230 is not available and/or may not be selected.

Optionally, the programmer can view, delete and/or edit the hand pose features 230 for the hand pose J by selecting the rendered image and/or specific one or more parts thereof while presented in the construction area 110J. Following the selection within the animated representation and/or specific one or more parts thereof, the corresponding menus 210K and/or sub-menus 220K will be presented to the programmer. The programmer may make the selection within the animated representation using an input device such as, for example, a keyboard, a touchscreen and/or a pointing device such as for example, a mouse, a trackball, a game controller, a joystick and the likes.

Figure 3:
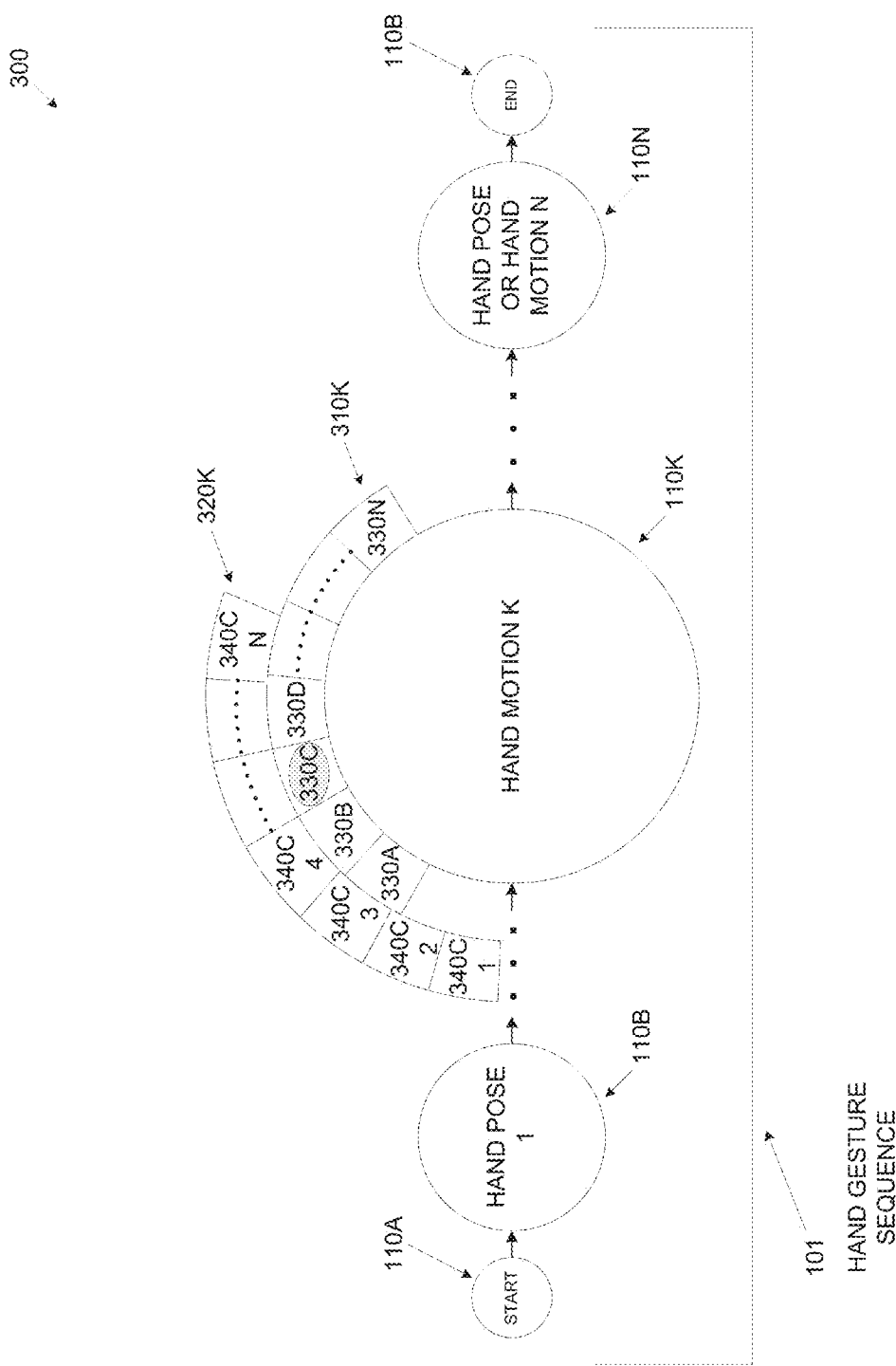
FIG. 3 is a schematic illustration of exemplary hand motion construction area using an exemplary visual gesture builder, according to some embodiments of the present disclosure.

Reference is now made to FIG. 3 which is a schematic illustration of exemplary hand motion construction area using an exemplary visual gesture builder, according to some embodiments of the present disclosure. As shown at 300, a hand gesture sequence, such as the hand gesture sequence 101 includes one or more hand poses and/or hand motions such as the hand poses and/or hand motions 1-N. A hand motion J is selected and a construction area 110K is assigned to it. The construction area 110K may present an animated representation of the hand motion K. Once the hand motion K is selected for creating, deleting and/or editing, a hierarchical menu driven interface is presented to the programmer next to the construction area 110K. The hierarchical menu driven interface includes one or more menus 310K and sub-menu 320K. The presented hierarchical menu structure is exemplary and may include additional levels of sub-menus available to the programmer to create, delete and/or edit the hand motion K. The menu 310K includes one or more fields each associated, for example, with one of the plurality of hand motion features 330 (330A-330N) available for the hand motion K. Each of the one or more fields of the hand motion features 330 may be associated with a sub-menu 320K which presents one or more fields indicating one or more discrete motion values 340 (340A-340N) available for the associated hand pose feature of the hand pose features 330. A sub-menu 320K is opened and displayed for a hand motion feature 330K in case the hand motion feature 330K is selected by the programmer. The sub-menu 320K may present a plurality of discrete pose values 340C (340C1 through 240CN) which are available for the hand motion feature 330C. Additional one or more sub-menus such as the sub-menu 320K may be displayed to present the programmer with additional optional hand motion features and/or discrete motion values available for one or more of the hand motion features and/or discrete motion values of the previous sub-menu 220J.

Optionally, the one or more menus 310K and sub-menus 320K of the hierarchical menu driven interface are implemented through arc shaped menus and sub-menus. The main menu 310K is adjacent to the construction area and wraps the perimeter of the construction area. Each of the one or more levels of the hierarchical menu driven interface is opened at larger radium from the center of the construction area 110K.

Optionally, the visual representation of the selected hand motion K is enlarged to allow the programmer easy visibility, navigation and/or selection.

Optionally, one or more of the hand motion features 330 which are not available for the selected hand motion K are shown as not available, for example, greyed out, indicating the programmer that the hand motion feature 330 is not available and/or may not be selected.

Optionally, the programmer can view, delete and/or edit the hand motion features 330 for the hand motion K by selecting the animated representation and/or specific one or more parts thereof while presented in the construction area 110K. Following the selection within the animated representation and/or specific one or more parts thereof, the corresponding menus 310K and/or sub-menus 320K will be presented to the programmer. The programmer may make the selection within the animated representation using an input device such as, for example, a keyboard, a touchscreen and/or a pointing device such as for example, a mouse, a trackball, a game controller, a joystick and the likes.

Optionally, the programmer navigates between the one or more menu 210J/310K and sub-menu 220J/320K by performing a continual movement over one or more of the fields of the menu 210J/310K and sub-menu 220J/320K as desired to create, edit and/or delete one or more of the hand poses J and/or the hand motions K. The continual movement may be performed by the programmer using one or more HMI interfaces, for example, a touchscreen, a digital surface and/or pointing device such as, for example, a mouse. The continual movement may allow the programmer to swiftly and rapidly create, edit and/or remove one or more of the hand pose/motion features 230/330 and/or the discrete pose/motion values 240/340.

According to some embodiments of the present disclosure, one or more hand poses such as the hand pose J and/or a hand motion such as the hand motion K are inserted into the gestures visual builder tool environment by the programmer using one or more imaging devices. The imaging device(s) may include, for example, a camera, a depth camera, a stereo camera and/or an IR camera. The one or more hand poses J and/or the hand motions K may be articulated by the programmer and captured by the imaging device(s). One or more images of the captured one or more hand poses J and/or hand motions K are analyzed and injected into a hand gesture sequence such as the hand gesture sequence 101. Optionally, the programmer inserts the one or more hand pose J and/or the hand motion K into gestures visual builder tool environment using one or more of a plurality of sensors, for example, a sonic sensor such as for example a sonar, a radiation emitting sensor such as, for example, an X-Ray device and/or a magnetic resonance sensor such as, for example, a Magnetic resonance imaging (MRI). More optionally, the programmer inserts the one or more hand pose J and/or the hand motion K into gestures visual builder tool environment using a mechanical robot and/or device which is capable to follow an articulated hand pose and/or motion. Once included in the hand gesture sequence 101, the one or more hand poses J and/or hand motions K may be edited and/or deleted using the gesture visual builder using the hierarchical menu driven interface as described hereinabove.

Figure 4:
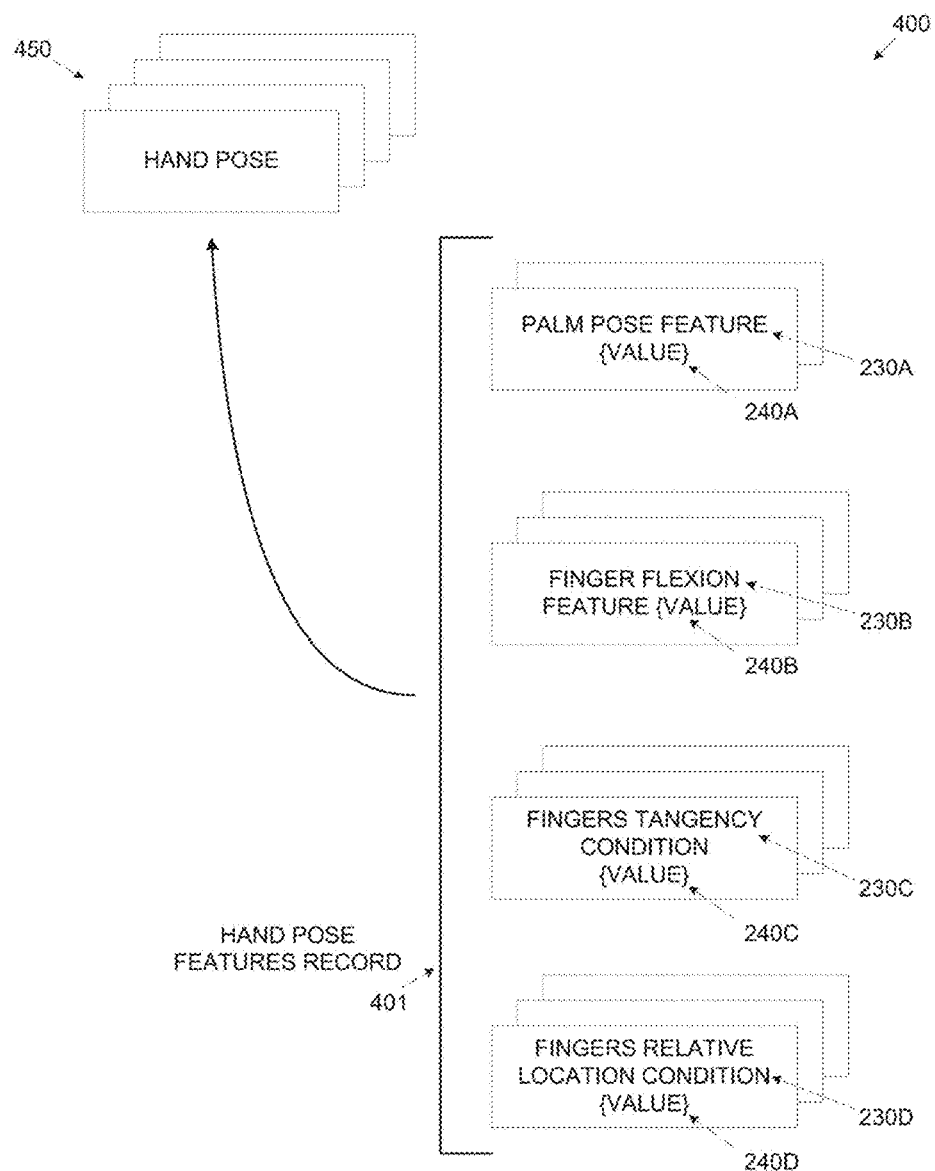
FIG. 4 is a schematic illustration of exemplary hand poses construction using a gestures visual builder tool, according to some embodiments of the present disclosure.

Reference is now made to FIG. 4 which is a schematic illustration of exemplary hand poses construction using a gestures visual builder tool, according to some embodiments of the present disclosure. Illustration 400 depicts exemplary hand poses 450 representation construction using a gestures visual builder tool. Each of the hand poses 450 is represented as a hand pose features record 401 which includes one or more hand pose features 230A, 230B, 230C and 230D. Each of the hand pose features may be assigned with one or more discrete pose value 240A, 240B, 240C and/or 240D which identify the state (value) of the respective hand pose feature 230A, 230B, 230C and/or 230D for an associated hand pose of the hand poses 450. Continuous values of the one or more hand pose features 230A, 230B, 230C and/or 230D may be represented by the discrete pose values 240A, 240B, 240C and/or 240D by quantizing the continuous values. The combination of the one or more discrete pose values 240 of the respective hand pose features 230 as defined by the hand pose features record 401 identifies a specific pose of the hand poses 450 which may be used by a programmer to create one or more hand gestures. The hand pose features record 401 may be represented as, for example, a features vector, a features matrix and/or a features table. The hand pose features record 401 may include values of one or more of the following hand pose features 230:

Palm pose features—one or more pose features 230A may include, for example, hand selection 230A1, palm direction 230A2, palm rotation 230A3 and/or hand location 230A4. The hand selection feature 230A1 may identify which hand is active and may be defined by discrete pose values 240A such as, for example, right, left and/or both. The palm direction feature 230A2 may define the direction in which the palm of the active hand is facing and may be defined by discrete pose values 240A such as, for example, left, right, up, down, forward and/or backward. The palm rotation 230A3 may define the rotation state of the palm of the active hand and may include discrete pose values 240A such as, for example, left, right, up, down, forward and/or backward The hand location feature 230A4 may identify the spatial location of the active hand in space and may be defined by discrete pose values 240A such as, center of field of view (FOV), right side of FOV, left side of FOV, top of FOV, bottom of FOV, front of FOV and/or rear of FOV. Where FOV is for example, the visible space of an imaging device monitoring the movement of the user's hand. Optionally, the hand location feature 230A4 is identified with respect to a fixed object present in the FOV, for example, keyboard and/or pointing device so that the hand location features 230A43 may be defined by discrete pose values 240A such as, for example, above_keyboard, behind_keyboard, right_of_keyboard and/or left_of_keyboard.

Finger flexion features—one or more finger flexion features 230B which are defined per finger. For example, a finger flexion feature 230B may be a flexion and/or a curve state which may be defined by one or more discrete pose values 240B such as, for example stretched, folded and/or open represented, for example by 0, 1, and 2. Each finger (thumb, index, middle, ring and/or pinky) may be assigned with one or more finger features 230B, for example, {thumb, middle, ring, pinky} in {folded} state and {index} in {stretched} state.

Finger tangency condition features—one or more fingers tangency features 230C which may be defined per finger. The tangency feature 230C may identify a touch condition of any two or more fingers and/or touch type and may be defined by discrete pose values 240C such as, for example, not touching, fingertip and/or full touch.

Finger relative location condition features—one or more fingers relative location features 230D may be defined per finger. Each of the fingers relative location condition features 230D may identify a relative location of one finger in relation to another. The fingers relative location features 230D may be defined by discrete pose values 240D such as, for example, one or more fingers are located relatively to another one or more fingers to the left, right, above, below, inward, outward, in front and/or behind.

Each one of the hand poses 450 is defined by a unique one of the hand pose features records 401 which may be a combination and/or sequence of one or more discrete pose values 240 each providing a value of the corresponding hand pose feature 230. The hand pose features records 401 may include only some (and not all) of the discrete pose values 240A while other discrete pose values 240A which are not included are left free. For example, the hand pose features records 401 may define a specific state of the fingers (for example discrete pose values 230B) while the direction and rotation of the palm of the active hand is left unspecified (for example hand pose features 230A2 and/or 230A3). In this case the hand pose 450 is identified, recognized and/or classified in runtime at the detection of the fingers state as defined by the hand pose features records 401 with the palm of the active hand facing any direction. Using the discrete pose values 240 allows for simple creation of the hand pose 450 as there are a finite number of discrete pose values 240 with which the hand pose 450 is created. For instance, the palm direction feature 230A2 included in the hand pose feature 230A may include up to six discrete pose values 240A—left, right, up, down, forward and backward. The discrete representation of the hand pose features 230A, 230B, 230C and/or 230D may not be limited to discrete values only. Continuous values of the one or more hand features 410, 420, 430 and/or 440 may be represented by discrete pose values 240A, 240B, 240C and/or 240D respectively by quantizing the continuous values. For example, the palm rotation palm pose feature 230A3 may be defined with 8 discrete motion values 240A1-240A6—0°, 45°, 90°, 135°, 180°, 225°, 270° and 315° to quantize the complete rotation range of 0°-360°.

Figure 5:
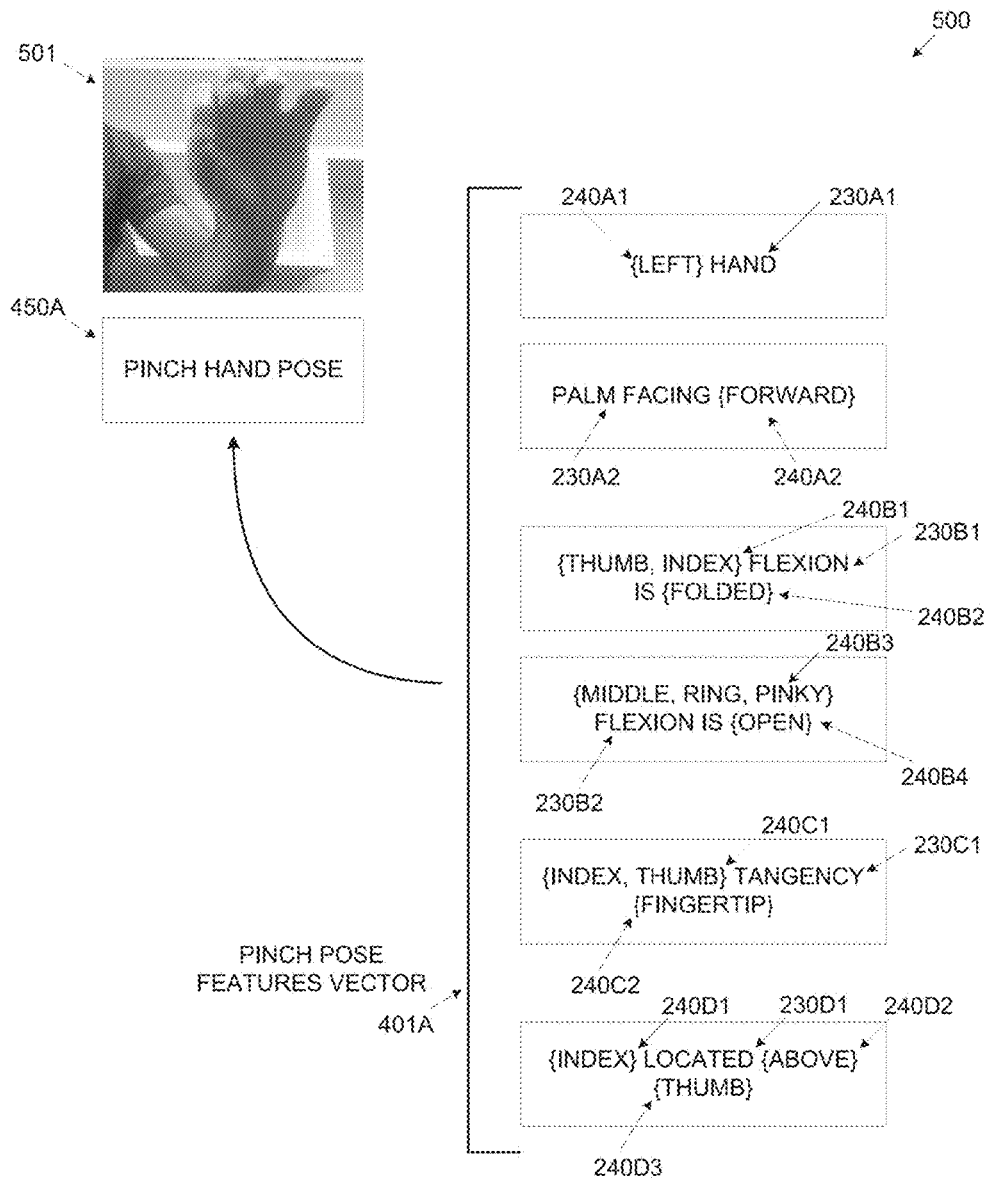
FIG. 5 is a schematic illustration of an exemplary pinch hand pose construction using a gestures visual builder tool, according to some embodiments of the present disclosure.

Reference is now made to FIG. 5 which is a schematic illustration of an exemplary pinch hand pose construction using a gestures visual builder tool, according to some embodiments of the present disclosure. Illustration 500 depicts an exemplary pinch hand pose 450A construction using a gestures visual builder tool. The pinch hand pose 450A is represented by a pinch pose features record 401A comprising discrete pose values such as the discrete pose values 240, each indicating a value of a corresponding hand pose feature such as the hand pose features 230. The pinch hand pose 450A which is visualized through an image capture 501 is created with some of the plurality of discrete pose values 240 as follows:

A hand selection feature 230A1 is assigned a discrete pose value 240A1 to indicate the left hand is active.

A palm direction feature 230A2 is assigned a discrete pose value 240A2 to indicate the palm of the active hand is facing forward.

A fingers flexion feature 230B1 is assigned a discrete pose value 240B1 and a discrete pose value 240B2 to indicate the thumb and index fingers are folded.

A fingers flexion feature 230B2 is assigned a discrete pose value 240B3 and a discrete pose value 240B4 to indicate the middle, ring and pinky fingers are open.

A fingers tangency condition feature 230C1 is assigned a discrete pose value 240C1 and 240C2 to indicate the thumb and index fingers are touching at their tips.

A fingers relative location feature 230D1 is assigned a discrete pose value 240D1, a discrete pose value 240D2 and a discrete pose value 240D3 to indicate the index finger is located above the thumb finger.

As seen above, the pinch hand pose 450A is uniquely defined by a pinch features pose features record 401A comprising the discrete pose values 240A1-240A2, 240B1-240B4, 240C1-240C2 and 240D1-240D3 corresponding to the hand pose features 230A1-230A2, 230B1-230B2, 230C1 and 230D1 respectively. Similarly additional hand poses 450 may be created using the gestures visual builder tool.

Figure 6:
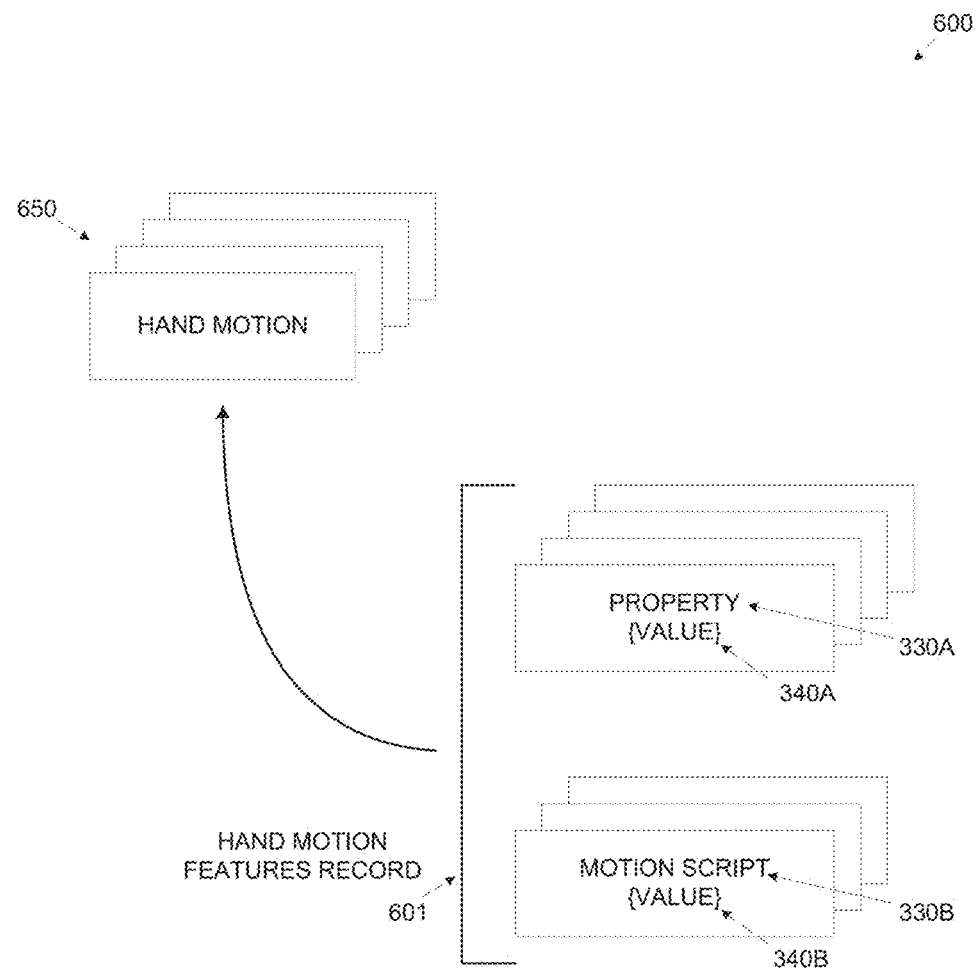
FIG. 6 is a schematic illustration of exemplary hand motions construction using a gestures visual builder tool, according to some embodiments of the present disclosure.

Reference is now made to FIG. 6 which is a schematic illustration of exemplary hand motions construction using a gestures visual builder tool, according to some embodiments of the present disclosure. Illustration 600 depicts exemplary hand motions 650 representations construction using a gestures visual builder tool. Each of the hand motions 650 is represented as a hand motion features record 601 which includes one or more hand motion features 330. Each of the hand motion features 330 may be assigned with one or more discrete motion values 340 which identify the state (value) of the respective hand motion feature 330 for an associated hand motion of the hand motions 650. Continuous values of the one or more hand motion features 330 may be represented by the discrete pose values 340 by quantizing the continuous values. The hand motion features record 601 identifies a specific motion of a hand which may later be to create one or more hand gestures. The hand motion features record 601 may be represented as, for example, a features vector, a features matrix and/or a features table. The hand motion features record 601 may include one or more of the following hand motion features 330:

Motion property features—one or more motion property features 330A may include, for example, motion size 330A1, motion speed 330A2 and/or motion location 330A3. Motion size 330A1 may identify the size (scope) of the motion, and may be defined by discrete motion values 340A such as, for example, small, normal and/or large. Motion speed 330A2 may identify the speed of the motion and may be defined by discrete motion values 340A such as, for example, slow, normal, fast and/or abrupt. Motion location 330A3 may identify the spatial location in which the motion is performed, and may be defined by discrete motion values 340A such as, for example, center of FOV, right side of FOV, left side of FOV, top of FOV, bottom of FOV, front of FOV and/or rear of FOV. Optionally, hand location 330A3 is expressed with respect to a fixed object present in the FOV, for example, keyboard and/or pointing device so that relative hand location feature 330A3 may include discrete motion values 340A such as, for example, above_keyboard, behind_keyboard, right_of_keyboard and/or left_of_keyboard.

Motion script features—one or more motion script features 330B may define the actual motion performed and/or hand trajectory. The motion script values 330B may include, for example, motion direction 330B1, motion start point 330B2, motion end point 330B3 and/or pre-defined curve shapes 330B4. The motion direction feature 330B1 may include discrete motion values 340B such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left_downward, counter_clockwise_arc_right_upward, counter_clockwise_arc_right_downward, counter_clockwise_arc_left_upward and/or counter_clockwise_arc_left_downward. The pre-defined curve shapes discrete motion values 330B4 may include for example, at-sign (@), infinity sign (∞), digit signs, alphabet signs and the likes. Optionally, additional one or more curve shapes may be created as pre-defined curves, for example, checkmark, bill request and the likes as it is desirable to use hand gestures which are intuitive and publically known, for example, at-sign for composing and/or sending an email, checkmark sign for a check operation and/or a scribble for asking for a bill. The one or more curve shapes may optionally be created using a freehand tool in the format of, for example, SVG. Each of the motion script features 330B is defined for a 2D plane, however each of the motion script features 330B may be transposed to depict another 2D plane, for example, X-Y, X-Z and/or Y-Z. Optionally, the motion script features 330B define three dimensional (3D) motions and/or curves using a 3D image data representation format.

Each one of the hand motions 650 is defined by a unique one of the hand motion features records 601 which may a combination and/or sequence of one or more discrete motion values 340 each providing a value of the corresponding hand motion feature 330. Using the discrete motion values 340 allows for simple creation of the hand motions 650 as there is a finite number of discrete motion values 340 with which the hand motion 650 is created. For instance the motion speed feature 330A2 included in the hand motion property feature 330A may include up to four discrete motion values 340A—slow, normal, fast and abrupt. The discrete representation of the hand motion features 330 may not be limited to discrete values only, continuous values of the one or more hand motion features 330 may be represented by discrete motion values 340 by quantizing the continuous values. For example, the motion speed property feature 330A may be defined with 6 discrete motion values 340A—5 m/s (meter/second), 10 m/s, 15 m/s, 20 m/s, 25 m/s and 30 m/s to quantize the motion speed of a normal human hand of 0 m/s-30 m/s.

Figure 7:
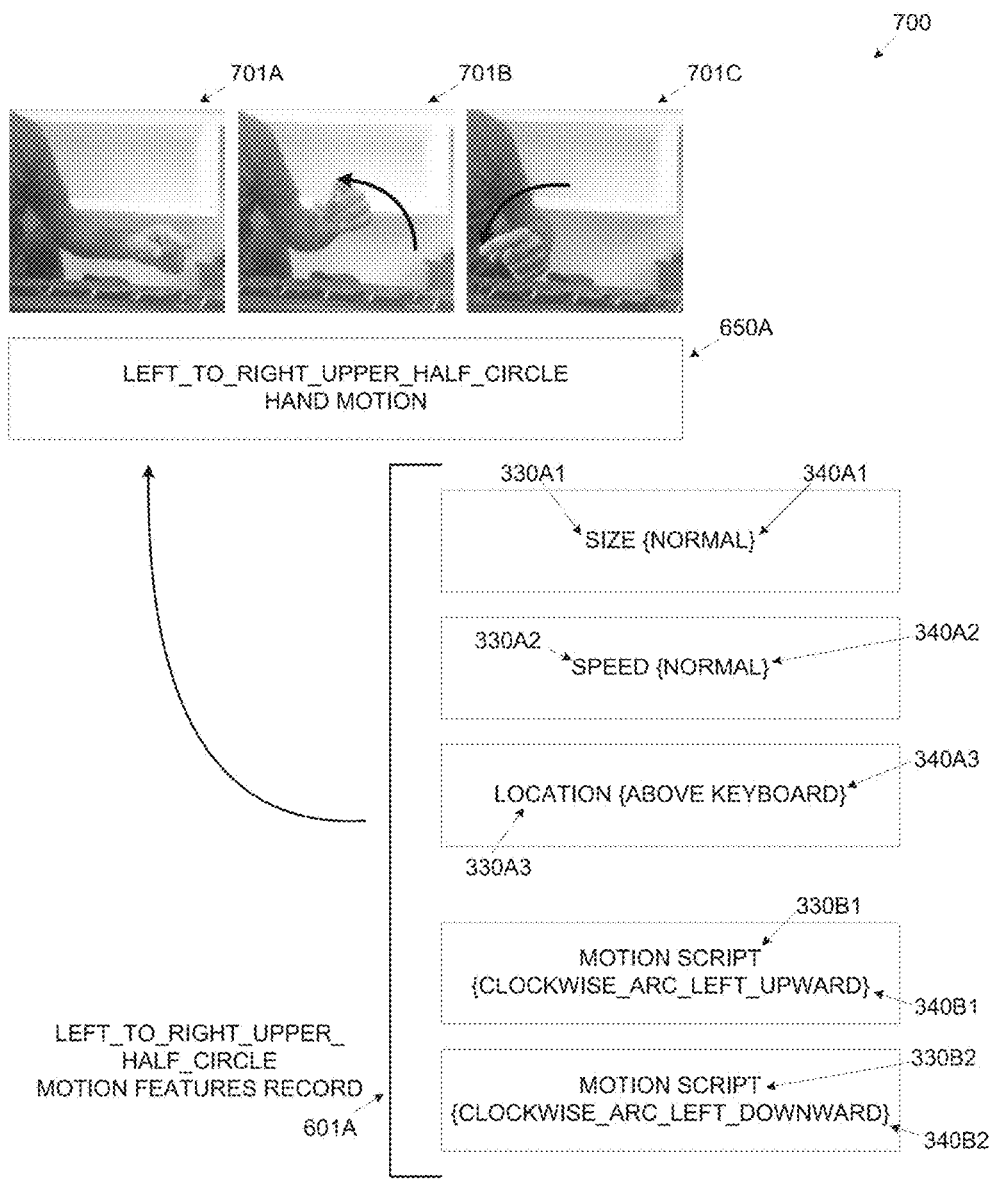
FIG. 7 is a schematic illustration of an exemplary half circle hand motion construction using a gestures visual builder tool, according to some embodiments of the present disclosure.

Reference is now made to FIG. 7 which is a schematic illustration of an exemplary half circle hand motion construction using a gestures visual builder tool, according to some embodiments of the present disclosure. Illustration 700 depicts an exemplary left_to_right_upper_half_circle hand motion 650A construction by a left_to_right_upper_half_circle motion features record 601A comprising a plurality of discrete motion values 340, each indicating a corresponding hand motion feature such as the hand motion features 330. The left_to_right_upper_half_circle hand motion 650A which is visualized through image captures 701A, 701B and 701C is created with some of the plurality of discrete motion values 340 as follows:

A motion size feature 330A1 is assigned a discrete motion value 340A1 to indicate the motion size is normal.

A motion speed feature 330A2 is assigned a discrete motion value 340A2 to indicate the motion speed is normal.

A motion location feature 330A3 is assigned a discrete motion value 340A3 to indicate the motion is performed above a keyboard.

A first motion script feature 330B1 is assigned a discrete motion value 340B1 to indicate a motion shape of clockwise_arc_left_upward as presented by the image capture 701B.

A second motion script feature 330B2 is assigned a discrete motion value 340B2 to indicate a motion shape of clockwise_arc_left_downward as presented by the image capture 701C.

As seen above, the left_to_right_upper_half_circle motion 650A is uniquely defined by a left_to_right_upper_half_circle motion features record 601A comprising of the discrete motion values 340A1-340A3 and 340B1-340B2 corresponding to the hand motion features 330A1-330A3 and 330B 1-330B2 respectively. Similarly additional hand and/or finger(s) motion may be created using the gestures visual builder tool.

Figure 8:
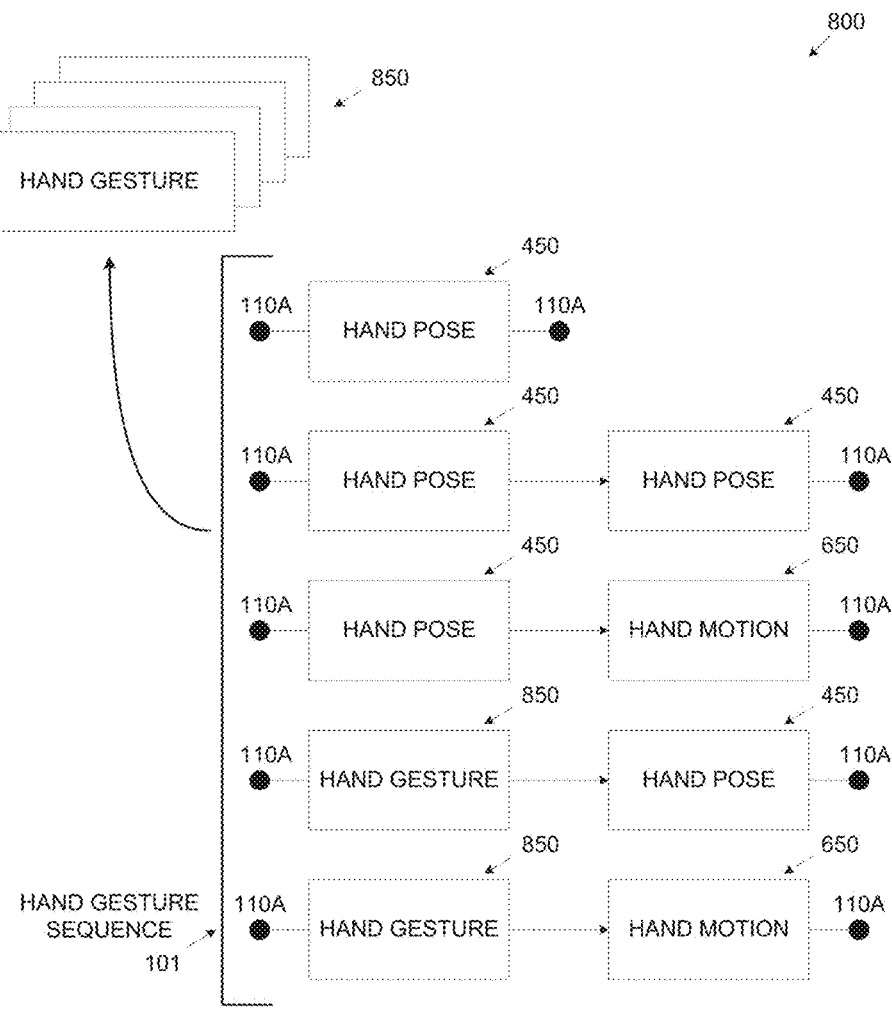
FIG. 8 is a block diagram of the building blocks of exemplary hand gestures, according to some embodiments of the present disclosure.

Reference is now made to FIG. 8 which is a block diagram of the building blocks of an exemplary hand gesture, according to some embodiments of the present disclosure. Illustration 800 depicts several construction schemes of exemplary hand gestures (representation) 850. The hand gestures 850 representation may be created using a gestures visual builder tool through one or more possible constructions, for example:

(a) The hand gesture 850 may consist of a hand pose, such as one of the hand poses 450.

(b) The hand gesture 850 may be a combination and/or sequence of two of the hand poses 450.

(c) The hand gesture 850 may be a combination and/or sequence of one of the hand poses 450 and a hand motion, such as one of the hand motions 650.

(d) The (first) hand gesture 850 may be a combination and/or sequence of a second hand gesture 850 and one of the hand poses 450. The second hand gesture 850 may be the same one as the first hand gesture 850 or a different one of the hand gestures 850.

(e) The (first) hand gesture 850 may be a combination and/or sequence of a second hand gesture 850 and one of the hand motions 650. The second hand gesture 850 may be the same one as the first hand gesture 850 or a different one of the hand gestures 850.

The hand gesture 850 may be created through multiple iterations of the constructions (d) and/or (e) above. Each hand gesture 850 is constructed as a unique combination and/or sequence represented by a logical hand gesture sequence, such as the hand gesture sequence 101 which comprises of one or more of the: hand poses 450, hand motions 650 and/or hand gestures 850. Each of the hand gestures 850 starts and ends with idle state such as the idle state 110A identifying the start and/or end of the unique hand gesture sequence 101 of the hand gesture 850, for example, an idle hand pose.

Figure 9:
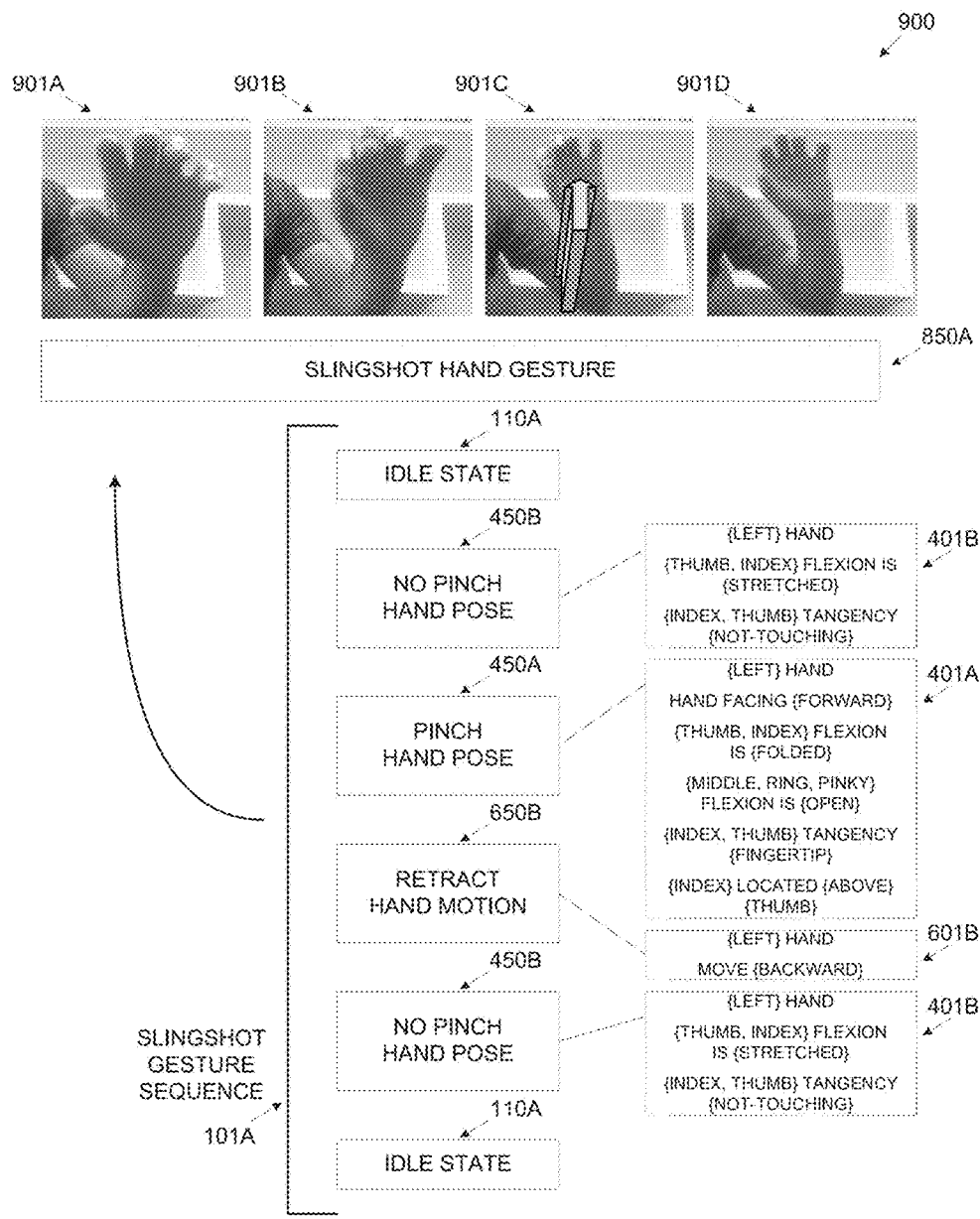
FIG. 9 is a block diagram of the building blocks of an exemplary slingshot hand gesture, according to some embodiments of the present disclosure.

Reference is now made to FIG. 9 which is a block diagram of the building blocks of an exemplary slingshot hand gesture, according to some embodiments of the present disclosure. Illustration 900 depicts an exemplary slingshot hand gesture 850A construction as a logical hand gesture sequence such as the hand gesture sequence 101 which comprises hand poses such as the hand poses 450 and hand motions such as the hand motions 650. The slingshot hand gesture 850A which is visualized through image captures 901A, 901B, 901C and 901D is constructed of a combination and/or sequence of a no pinch hand pose 450B, a pinch hand pose such as the pinch hand pose 450A and a retract hand motion 650B. The sequence of the slingshot hand gesture 850A is as follows:
- An idle state such as the virtual idle state 110A defines the starting state and/or point of the slingshot hand gesture 850A.
- A no pinch hand pose 450B defined by a hand pose features record 401B represents no pinching action as depicted in image capture 901A.
- A pinch hand pose 450A defined by the hand pose features record 401A in which a pinch action is identified as depicted in image capture 901B.
- A retract hand motion 650A defined by a hand motion features record 601B in which the hand is moved backwards as is depicted in image capture 901C.
- A no pinch) hand pose 450B defined by the hand pose features record 401B in the pinch pose is released and identified as no pinching action as depicted in image capture 901D.
- An idle state 110A defines the end state and/or point of the s slingshot hand gesture 850C.

The sequence of the slingshot hand gesture 850A as described above is represented through a unique logical slingshot hand gesture sequence 101A such as the hand gesture sequence 101 which may be utilized as an FSM to be associated with the slingshot hand gesture 850A. For any of the hand poses 450 and/or hand motions 650 only relevant discrete pose and/or motion values may be defined, as is evident, for example, from the no pinch hand pose features record 401B in which the hand selection discrete pose value 230A1 (left), the finger flexion discrete pose value 230B (stretched) and the finger tangency discrete pose value 230C (not touching) are defined for the no pinch hand pose 450B. Other discrete pose values which are irrelevant to distinguishing between the no pinch hand pose 450B from the pinch hand pose 450A are left free and are not specified. Specifying only the relevant discrete pose and/or motion values allows for several degrees of freedom in the articulation of the hand poses 450 and/or hand motions 650 as performed by different one or more users at runtime. This means each of the one or more users may perform the hand pose 450 and/or hand motion 650 slightly differently and yet they are still recognized, identified and/or classified the same.

The gestures visual builder tool may create the one or more hand gestures 850 using a gestures library and a gestures API. The gestures API allows a common interface for one or more programmers to make use of the one or more hand gestures 850 in order to integrate them with one or more applications.

The unique combination and/or sequence of each of the hand gestures 850 may be represented by a unique FSM, i.e. the FSM includes one or more of the hand poses 450 and/or the hand motions 650 to represent the hand gesture 850.

Figure 10:
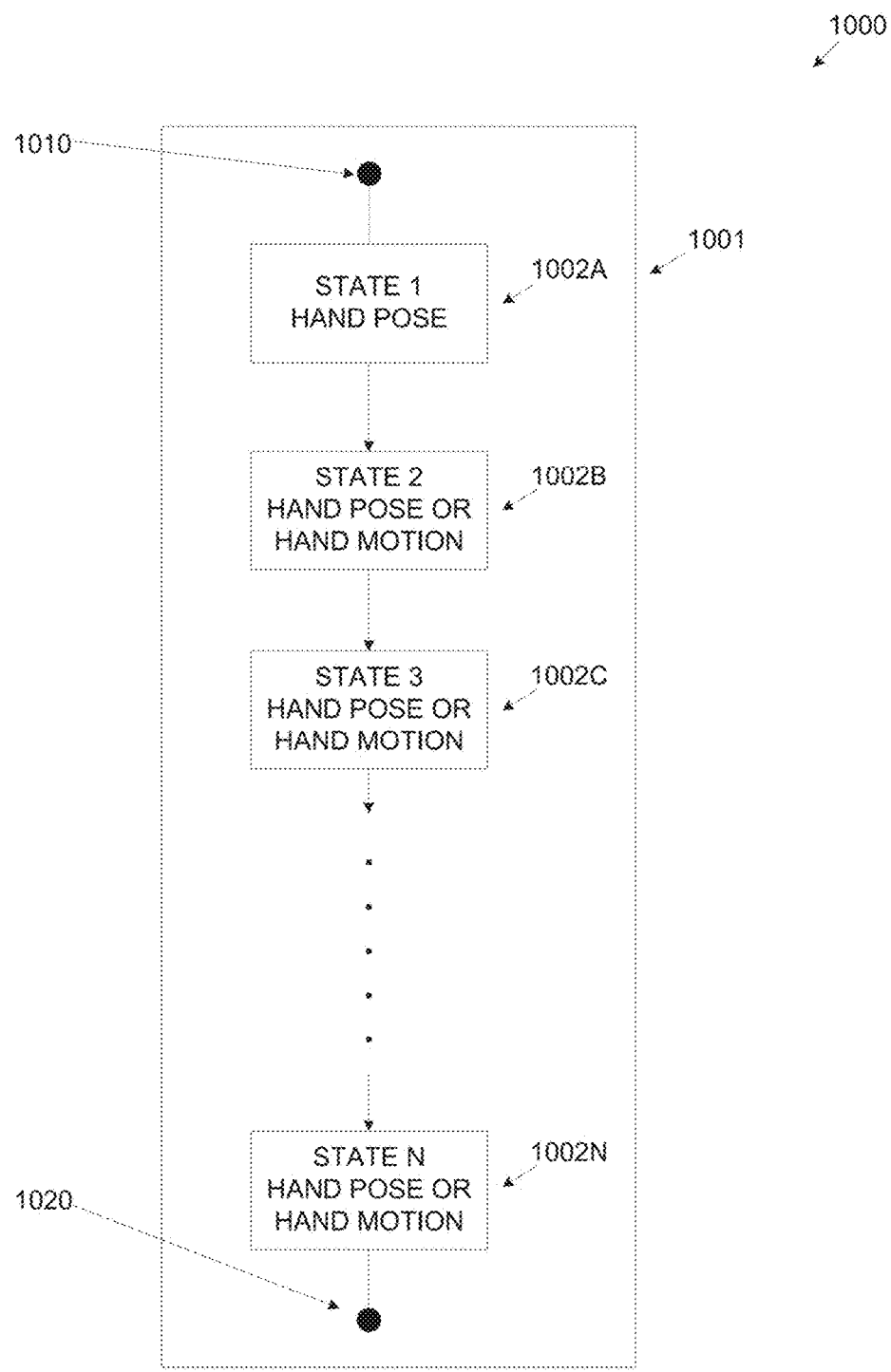
FIG. 10 is a schematic illustration of an exemplary FSM defining hand gestures by a sequence of hand motions and hand poses, according to some embodiments of the present disclosure.

Reference is now made to FIG. 10 which is a schematic illustration of a finite state machine (FSM) defining hand gestures by a sequence of hand motions and hand poses, according to some embodiments of the present disclosure. An illustration 1000 depicts an FSM 1001 which may represent a hand gesture sequence such as the hand gesture sequence 101. The FSM 1001 may be created by a gestures visual builder tool to easily construct and represent one or more hand gestures such as the hand gestures 850 for easy recognition, identification and/or classification during runtime use. The FSM 1001 starts with a start point 1010 which may be a virtual state indicating an idle state of the FSM 1001 and may include one or more states 1002A, 1002B, 1002C through 1002N. The first state 1002A is a hand pose which is a start of a sequence representing a hand gesture such as the hand gesture 850. Each of the succeeding states 1002B, 1002C through 1002N may be either a hand pose such as the hand poses 450 or a hand motion such as the hand motions 650. The FSM 1001 is ended with an FSM end point 1020. The start point 1010 and/or the end point 1020 may be defined by a virtual idle state such as the idle state 110A. Optionally, the FSM 1001 may be constructed to represent a complex hand gestures such as the hand gestures 110 by including repetitions of one or more of the states 1002A-1002N, splitting to several parallel and/or sequential paths and/or combining two or more FSMs 1001 and/or parts thereof.

Figure 11:
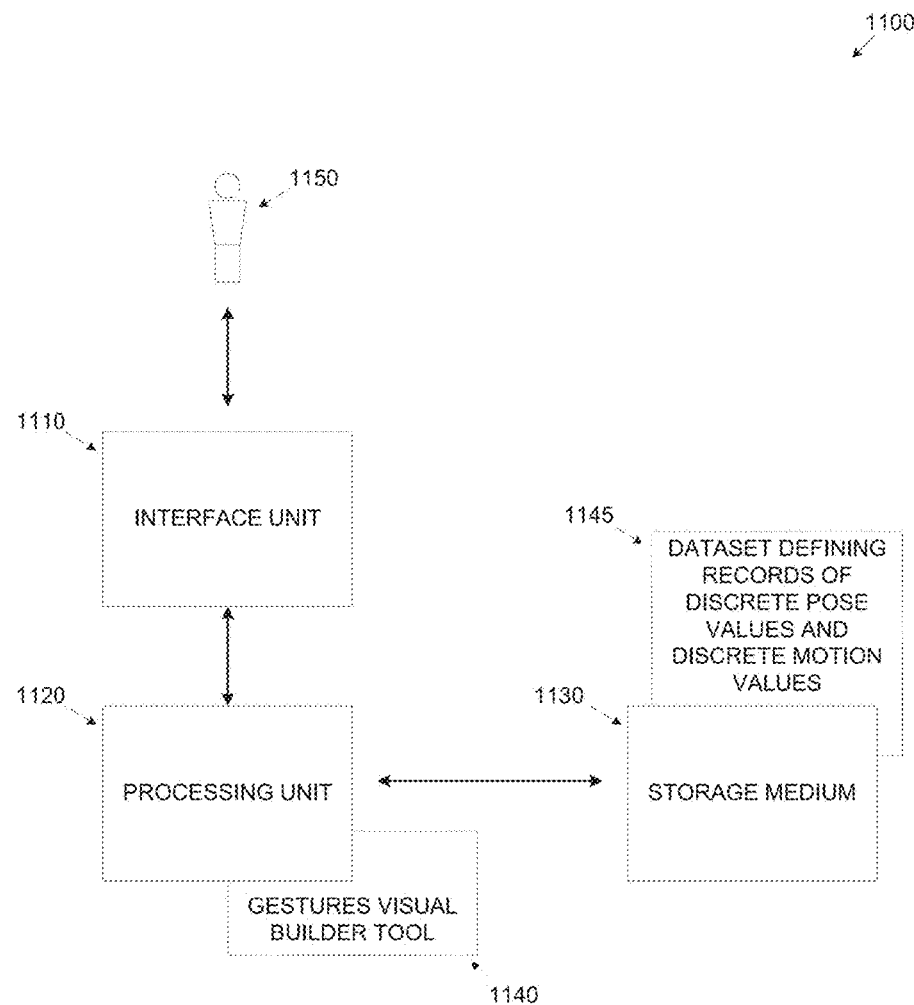
FIG. 11 is a schematic illustration of an exemplary system for creating hand gestures using a gestures visual builder tool, according to some embodiments of the present disclosure.

Reference is now made to FIG. 11 is a schematic illustration of an exemplary system for creating hand gestures using a gestures visual builder tool, according to some embodiments of the present disclosure. An exemplary system 1100 includes an interface unit 1110 for interacting with a programmer 1150, one or more hardware processors 1120 for creating one or more hand gestures such as the hand gestures 850 and a storage medium 1130 for storing the software code instructions of a gestures visual builder tool 1140 and a dataset with records defining discrete pose and discrete motion values 1145. Optionally the storage medium stores one or more of the hand gestures 850. The interface unit includes an input device, for example, keyboard, touchscreen, a digital surface and/or pointing device such as, for example, a mouse and an output device, for example a monitor, a projector and/or a screen. The processor 1120 executes the gestures visual builder tool 1140 which provides the programmer 1150 a platform and/or environment for creating the one or more hand gestures 850. The gestures visual builder tool 1140 may be utilized in the form of, for example, an IDE tool presenting a GUI which presents a gesture construction workspace such as presented in illustrations 100, 200 and 300.

Using the GUI, the programmer 1150 outlines the hand gesture 850 which is built as a hand gesture sequence such as the hand gesture sequence 101 creates, deletes or edits the one or more hand poses and/or hand motions such as the hand poses 450 and the hand motions 650 respectively. The programmer 1150 assigns each of the one or more hand poses 450 and/or hand motions 650 one or more discrete pose values such as the discrete pose values 240 and/or discrete motion values such as the discrete motion values 340. Each of the discrete pose values 240 indicates an appropriate value of a respective hand pose feature 230 to define the created hand pose 350. Similarly, each of the discrete motion values 340 indicates an appropriate value of a respective hand motion feature 330 to define the created hand motion 650. The gestures visual builder tool 1140 receives the dataset of discrete pose values 240 and/or discrete motion values 340, assigned by the programmer 1150, and generates a code segment which defines the dataset using the selected one or more discrete pose values 240 and/or the discrete motion values 340. The code segment may conform to a gesture API to support a common well established programming interface for creating, utilizing and/or distributing the hand gestures 850 to other one or more applications. A gestures library may be created which may be used by the programmer 1150 to integrate with other one or more applications. Optionally, dynamic linking of the gestures library us supported through a dynamic link library (DLL) that is loaded to the target computerized device to be linked with the other one or more applications in runtime.

Figure 12:
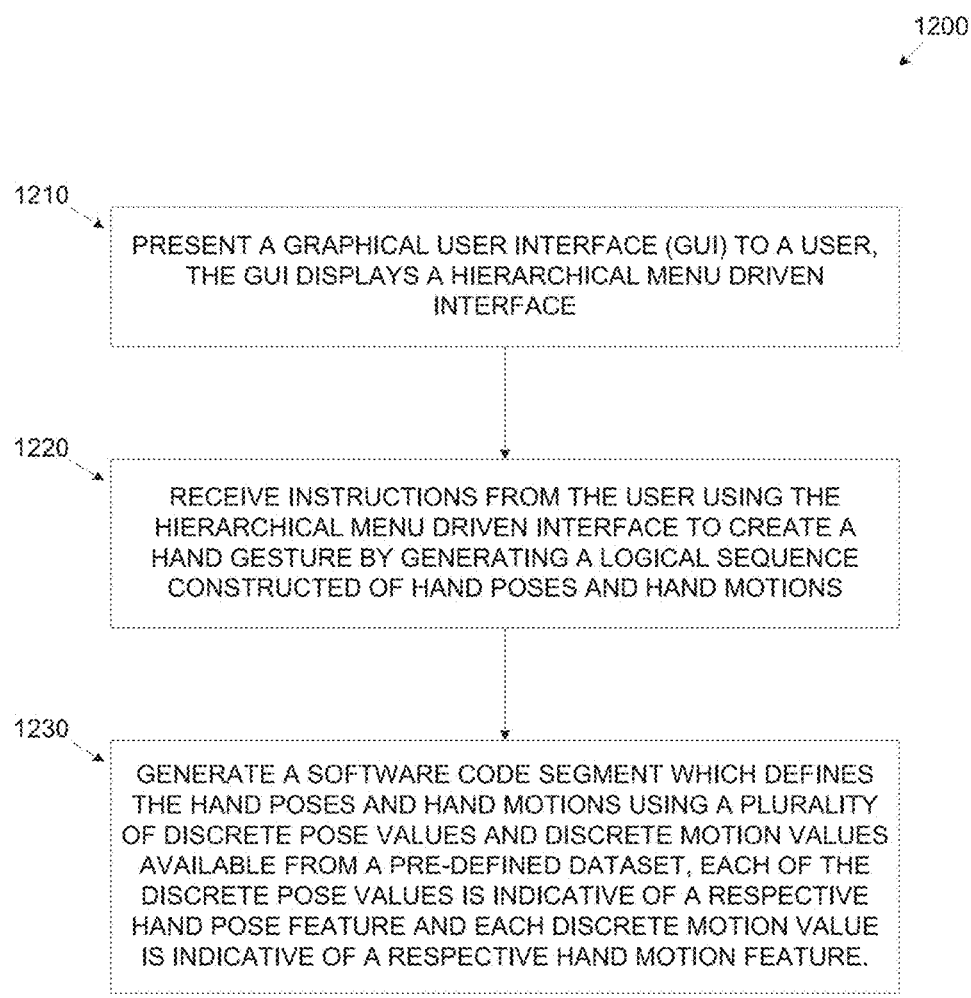
FIG. 12 is a flowchart of an exemplary process for creating hand gestures using a gestures visual builder tool, according to some embodiments of the present disclosure.

Reference is now made to FIG. 12 which is flowchart of an exemplary process for creating hand gestures using a gestures visual builder tool, according to some embodiments of the present disclosure. An exemplary process 1200 is executed in a system such as the exemplary system 1100. As shown at 1210, the exemplary process 1200 starts with presenting a programmer such as the programmer 1150 with a development platform and/or environment such as, for example, the gestures visual builder tool 1140 for creating one or more hand gestures such as the hand gestures 850. The GUI may present the programmer 1150 a hierarchical menu driven interface with options to construct a hand gesture sequence, such as the hand gesture sequence 101, for each of the one or more hand gestures 850 and navigate through it. The hierarchical menu driven interface may include one or more menu levels such as the menus 210J and/or 310K and/or sub-menus such as the sub menus 22J and/or 320K to allow the programmer 1150 to select one or more discrete pose values such as the discrete pose values 240 and/or discrete motion values such as the discrete motion values for defining the one or more poses and/or motion included in the hand gesture sequence 101. Each of the selected discrete pose values 240 indicates a value of a respective hand pose feature 230 and each discrete motion value 340 indicates a value of a respective of a respective hand motion feature 330. As shown at 1220, the selections of the programmer 1150 are received and a logical sequence is created for each of the one or more hand gestures and associated with it. The logical sequence includes the one or more hand poses and/or hand motions as defined by the user, each of the hand poses and hand motions is assigned a hand pose features record, such as hand pose record 401 and each hand motion is assigned a hand pose features record, such as hand motion record 601. As shown at 1230, a software code segment is generated to capture the hand gesture sequence 101 as defined by the one or more hand pose records 401 and/or hand motion records 601. The generated software code segment may be in the form of code instructions and/or a data representation for the created hand gesture such as, for example, JSON, XAML, and/or XML. The code segment may conform to a gesture API to support a common well established programming interface for creating, utilizing and/or distributing the hand gestures 850 to other one or more applications. A gestures library may be created which may be used by the programmer 1150 to integrate with other one or more applications. Optionally, dynamic linking of the gestures library us supported through a dynamic link library (DLL) that is loaded to the target computerized device to be linked with the other one or more applications in runtime.

Optionally, the programmer inserts the one or more hand pose J and/or the hand motion K into gestures visual builder tool environment using one or more imaging devices, for example, a camera, a depth camera, a stereo camera and/or an IR camera. The one or more hand poses J and/or the hand motions K may be articulated by the programmer and captured by the imaging device(s). One or more images of the captured one or more hand poses J and/or hand motions K are analyzed and injected into a hand gesture sequence such as the hand gesture sequence 101.

Optionally, the programmer inserts the one or more hand pose J and/or the hand motion K into gestures visual builder tool environment using one or more of a plurality of sensors, for example, a sonic sensor such as, for example, a sonar, a radiation emitting sensor such as, for example, an X-Ray device and/or a magnetic resonance sensor such as, for example, a Magnetic resonance imaging (MRI). One or more images of the captured one or more hand poses J and/or hand motions K are analyzed and injected into the hand gesture sequence 101.

More optionally, the programmer inserts the one or more hand pose J and/or the hand motion K into gestures visual builder tool environment using a mechanical robot and/or device which is capable to follow an articulated hand pose and/or motion. The articulated one or more hand poses and/or motions are analyzed and injected into a hand gesture sequence such as the hand gesture sequence 101.

Figure 13:
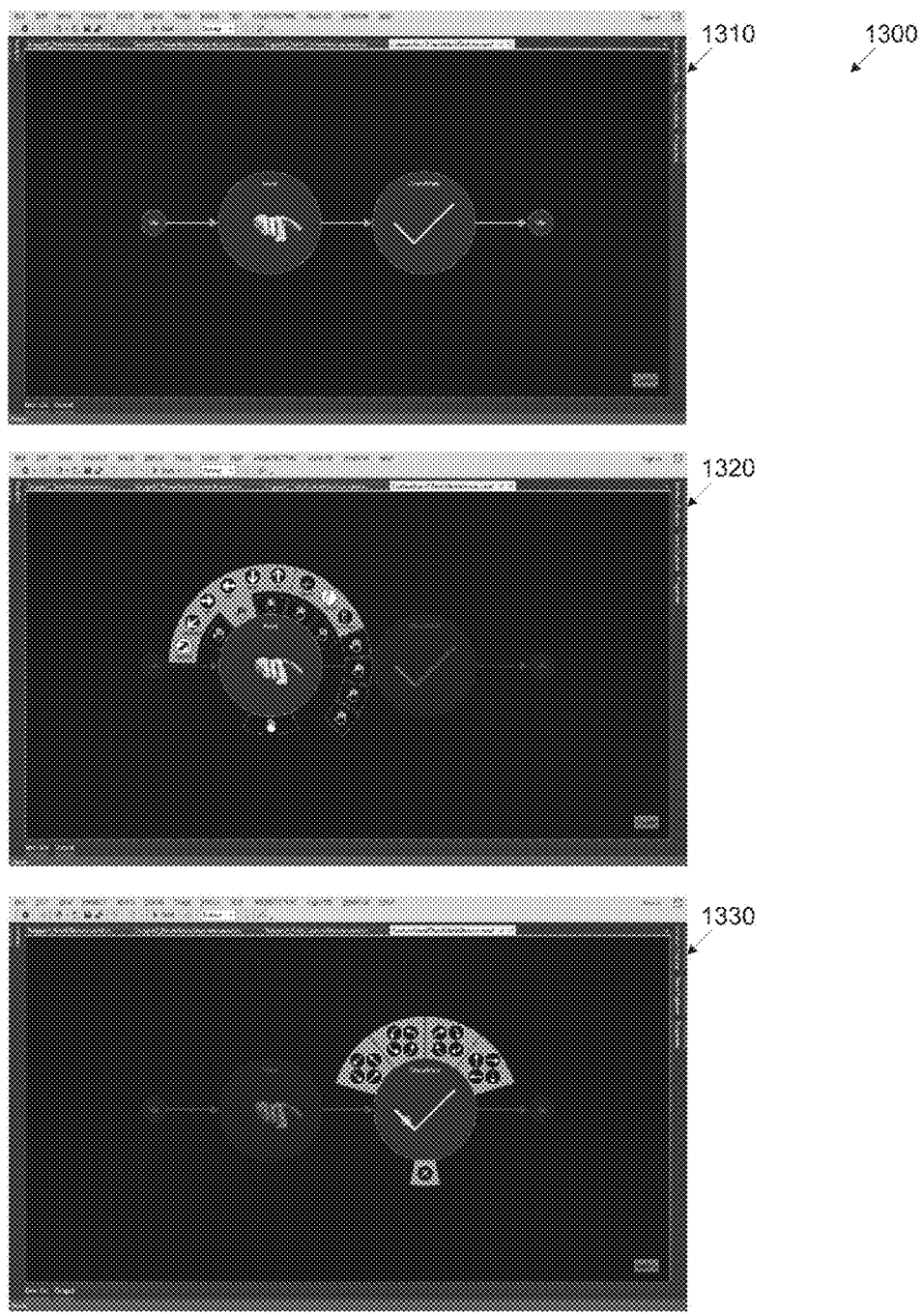
FIG. 13 is a schematic illustration presenting screen snapshots of an exemplary gestures visual builder tool, according to some embodiments of the present disclosure.

Reference is now made to FIG. 13 which is a schematic illustration presenting screen snapshots of an exemplary gestures visual builder tool, according to some embodiments of the present disclosure. An illustration 1300 presents 3 screen snapshots 1310, 1320 and 1330 of an exemplary gestures visual builder tool. The screen snapshots 1310, 1320 and 1330 describe the process of creating a checkmark hand gesture which may be one of the hand gestures 850. The screen snapshot 1310 presents a GUI of the exemplary gestures visual builder tool in which a hand gesture sequence such as the hand gesture sequence 101 is created for the checkmark hand gesture. The checkmark hand gesture sequence 101 includes a pointing finger hand pose which may be one of the hand poses 450 and a checkmark hand motion which may be one of the hand motions 650. The screen snapshot 1320 presents a construction area such as the construction area 110J which is assigned to the pointing finger hand pose. Menus such as the menu 210J and a sub-menu such as the sub-menu 220J are displayed by the GUI around the construction area 110J to allow a programmer such as the programmer 1150 to define the pointing finger flexion as desired. As shown at the screen snapshot 1320 a plurality of hand pose features such as the hand pose features 230 are presented in the main menu with the sub-menu presenting a plurality of discrete pose values such as the discrete pose values 240 with a respective hand motion feature 330 to allow the programmer 150 to easily define the pointing figure hand pose. The screen snapshot 1330 presents a construction area such as the construction area 110K which is assigned to the checkmark hand motion. Menus such as the menu 310K and a sub-menu such as the sub-menu 320K are displayed by the GUI around the construction area 110K to allow the programmer 1150 to define the checkmark hand motion as desired. As shown at the screen snapshot 1330 a plurality of hand motion features such as the hand motion features 330 are presented in the main menu with the sub-menu presenting a plurality of discrete motion values such as the discrete motion values 340 which are associated with a respective hand motion feature 330 to allow the programmer 150 to easily define the checkmark hand motion.

It is expected that during the life of a patent maturing from this application many relevant HMI and/or NMI will be developed and the scope of the term HMI and/or NMI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand gesture" or "at least hand gesture" may include a single hand gesture and/or two hands gestures.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there are provided systems for creating hand gestures, comprising an interface for interacting with a user, a storage storing a plurality of discrete pose values and a plurality of discrete motion values, a memory for storing a gesture visual builder code and one or more processors coupled to the interface, the storage and the memory to execute the gesture visual builder code to allow the user to create one or more hand gestures. The gesture visual builder code comprises code instructions to present a GUI displaying a hierarchical menu driven interface, code instructions to receive iteratively a plurality of user instructions indicated by the user using the hierarchical menu driven interface for creating a logical sequence of one or more hand gesture by defining one or more of a plurality of hand pose features records and a plurality of hand motion features records and code instructions to generate a code segment which defines the one or more hand pose features records through a respective set of one or more of the plurality of discrete pose values and the one or more hand motion features records through a set of one or more of the plurality of discrete motion values.

Each of the discrete pose values is indicative of a corresponding one of a plurality of hand pose features and each of the discrete motion values is indicative of a corresponding one of a plurality of hand motion features.

The hand pose feature is a member selected from a group consisting of: active hand, palm direction, palm rotation, flexion of one or more fingers, direction of one or more fingers, relative location between two or more fingers and/or tangency between two or more fingers.

The hand motion feature is a member selected from a group consisting of: motion properties and/or motion script. The motion script defines one or more of hand motion and motion of one or more fingers.

The logical sequence which represents said at least one hand gesture is defined by a unique FSM model.

Optionally, the generated code segment conforms to a gesture API.

Optionally, the GUI displays the logical sequence so that each of the one or more hand pose features records and the one or more hand motion features records is assigned with a construction area which is displayed with an associated instance of the hierarchical menu driven interface.

Optionally, the associated instance is a hierarchical arc menus structure comprising a plurality of menus shaped as arcs each having one or more of a plurality of feature fields. The hierarchical arc menus structure has one or more of a plurality of levels, a first level arc menu which is displayed by the GUI adjacent to the construction area and one or more of a plurality of next level arc menus. Each of the plurality of next level arc menus is adjacent to a respective previous level arc menu and having a larger radius from a center of the construction area. Each of the plurality of feature fields is associated with a gesture feature which is assigned with at least one of the plurality of discrete pose values and/or the plurality of discrete motion values.

Each next level arc menu is presented by the GUI following an indication in the one or more fields of the previous level arc menu. The indication is made by the user.

Optionally, the one or more feature fields are actively displayed to indicate availability of the associated gesture creation operation.

Optionally, one or more of the plurality of hand pose features records and/or the plurality of hand motion features records is included in the logical sequence by capturing one or more hand poses and/or hand motions. The one or more hand poses and/or hand motions are articulated by the user and captured by one or more imaging devices.

According to some embodiments of the present disclosure there are provided a computer implemented method for creating hand gestures. The method utilizes an application code executed on one or more processors. The method comprises presenting a GUI to a user where the GUI displays a hierarchical menu driven interface, receiving iteratively a plurality of user instructions indicated by the user using the hierarchical menu driven interface to create a logical sequence of at one or more hand gestures by defining at one or more of a plurality of hand pose features records and/or a plurality of hand motion features records and generating a code segment which defines the one or more hand pose features records through a set of one or more of a plurality of discrete pose values and the one or more hand motion features records through a set of one or more of a plurality of discrete motion values.

Each of the discrete pose values is indicative of a corresponding one of a plurality of hand pose features and each of the discrete motion values is indicative of a corresponding one of a plurality of hand motion features.

The hand pose feature is a member selected from a group consisting of: active hand, hand direction, palm rotation, flexion of one or more fingers, direction of one or more fingers, relative location between two or more fingers and/or tangency between two or more fingers.

The hand motion feature is a member selected from a group consisting of: motion properties and/or motion script. The motion script defines at least one of, hand motion and/or motion of one or more finger.

According to some embodiments of the present disclosure there are provided a software program product for creating hand gestures stored in a non-transitory computer readable storage medium. The software program product comprises first program instructions to present a graphical user interface (GUI) to a user where the GUI displays a hierarchical menu driven interface, second program instructions code instructions to receive iteratively a plurality of user instructions indicated by the user using the hierarchical menu driven interface to creating a logical sequence of one or more hand gesture by defining one or more of a plurality of, hand pose features records and/or hand motion features records and third program instructions code instructions to generate a code segment which defines the one or more hand pose features records through one or more of a plurality of discrete pose values and the one or more hand motion features records through one or more of a plurality of discrete motion values. The first, second and third program instructions are executed by one or more computerized processors from the non-transitory computer readable storage medium.

Each of the discrete pose values is indicative of a corresponding one of a plurality of hand pose features and each of the discrete motion values is indicative of a corresponding one of a plurality of hand motion features.

The hand pose feature is a member selected from a group consisting of: active hand, palm direction, palm rotation, flexion of one or more fingers, direction of one or more fingers, relative location between two or more fingers and/or tangency between two or more fingers.

The hand motion feature is a member selected from a group consisting of: motion properties and/or motion script, said motion script defines at least one of, hand motion and/or motion of one or more fingers.

The logical sequence which represents the one or more hand gestures is defined by a unique FSM model.

Optionally, the generated code segment conforms to a gesture API.

Optionally, the GUI displays the logical sequence so that each of the one or more hand pose features records and the one or more hand motion features records is assigned with a construction area which is displayed with an associated instance of the hierarchical menu driven interface.

Optionally, the associated instance is a hierarchical arc menus structure comprising a plurality of menus shaped as arcs each having one or more of a plurality of feature fields. The hierarchical arc menus structure has one or more of a plurality of levels, a first level arc menu which is displayed by the GUI adjacent to the construction area and one or more of a plurality of next level arc menus. Each of the plurality of next level arc menus is adjacent to a respective previous level arc menu and having a larger radius from a center of the construction area. Each of the plurality of feature fields is associated with a gesture feature which is assigned with at least one of the plurality of discrete pose values and/or the plurality of discrete motion values.

Each next level arc menu is presented by the GUI following an indication in the one or more fields of the previous level arc menu. The indication is made by the user.

Optionally, the one or more feature fields are actively displayed to indicate availability of the associated gesture creation operation.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A system for creating hand gestures representations, comprising:
    an interface for interacting with a user;
    a storage storing a plurality of discrete pose values and a plurality of discrete motion values;
    a memory storing a gesture visual builder code;
    at least one processor coupled to said interface, said storage and said memory, enabled to execute said gesture visual builder code to allow said user to create code segments representing at least one hand gesture, said gesture visual builder code comprising:
        code instructions to present a graphical user interface (GUI) to said user, said GUI displays a hierarchical menu driven interface;
        code instructions to receive iteratively a plurality of user instructions indicated by said user using said hierarchical menu driven interface, for creating a logical sequence of hand poses and hand motions constructing at least one hand gesture by defining at least one of a plurality of hand pose features records and a plurality of hand motion features records; and
        code instructions to generate a software code segment describing said at least one hand gesture by defining said at least one hand pose features record through at least one of said plurality of discrete pose values and said at least one hand motion features record through at least one of said plurality of discrete motion values;
    wherein said generated software code segment is adapted to be executed by at least one application for implementing a gesture Human Machine Interface (HMI).

2. The system of claim 1, wherein each of said discrete pose values is indicative of a corresponding one of a plurality of hand pose features and each of said discrete motion values is indicative of a corresponding one of a plurality of hand motion features.

3. The system of claim 2, wherein said hand pose feature is a member selected from a group consisting of: active hand, palm direction, palm rotation, flexion of at least one finger, direction of at least one finger, relative location between at least two fingers and tangency between at least two fingers.

4. The system of claim 2, wherein said hand motion feature is a member selected from a group consisting of: motion properties and motion script, said motion script defines at least one of: hand motion and motion of at least one finger.

5. The system of claim 1, wherein said logical sequence which represents said at least one hand gesture is defined by a unique finite state machine model.

6. The system of claim 1, further comprising said code segment conforms to a gesture application user interface (API).

7. The system of claim 1, further comprising said GUI displays said logical sequence so that each of said at least one hand pose features record and said at least one hand motion features record is assigned with a construction area which is displayed with an associated instance of said hierarchical menu driven interface.

8. The system of claim 7, further comprising said associated instance is a hierarchical arc menus structure comprising a plurality of menus shaped as arcs each having at least one of a plurality of feature fields, said hierarchical arc menus structure having at least one of a plurality of levels:
    a first level arc menu which is displayed by said GUI adjacent to said construction area; and
    at least one of a plurality of next level arc menus, each of said plurality of next level arc menus is adjacent to a respective previous level arc menu and having a larger radius from a center of said construction area;
    wherein each of said plurality of feature fields is associated with a gesture feature which is assigned at least one of: said plurality of discrete pose values and said plurality of discrete motion values.

9. The system of claim 8, wherein said each next level arc menu is presented by said GUI following an indication in said at least one field of said previous level arc menu, said indication is made by said user.

10. The system of claim 8, further comprising said at least one feature field is actively displayed to indicate availability of said associated gesture creation operation.

11. The system of claim 1, further comprising at least one of: said plurality of hand pose features records and said plurality of hand motion features records, is included in said logical sequence by capturing at least one of hand pose and hand motion, said at least one of hand pose and hand motion are articulated by said user and captured by at least one imaging device.

12. A computer implemented method for creating hand gestures representations, comprising:
  using an application code executed on at least one processor for:
    presenting a graphical user interface (GUI) to a user, said GUI displays a hierarchical menu driven interface;
    receiving iteratively a plurality of user instructions indicated by said user using said hierarchical menu driven interface, for creating a logical sequence of hand poses and hand motions constructing at least one hand gesture by defining at least one of a plurality of hand pose features records and a plurality of hand motion features records; and
    generating a software code segment describing said at least one hand gesture by defining said at least one hand pose features record through at least one of a plurality of discrete pose values and said at least one hand motion features record through at least one of a plurality of discrete motion values;
  wherein said generated software code segment is adapted to be executed by at least one application for implementing a gesture Human Machine Interface (HMI).

13. The computer implemented method of claim 12, wherein each of said discrete pose values is indicative of a corresponding one of a plurality of hand pose features and each of said discrete motion values is indicative of a corresponding one of a plurality of hand motion features.

14. The computer implemented method of claim 13, wherein said hand pose feature is a member selected from a group consisting of: active hand, hand direction, palm rotation, flexion of at least one finger, direction of at least one finger, relative location between at least two fingers and tangency between at least two fingers.

15. The computer implemented method of claim 13, wherein said hand motion feature is a member selected from a consisting of: motion properties and motion script, said motion script defines at least one of: hand motion and motion of at least one finger.

16. A software program product for creating hand gestures representations, comprising:
  a non-transitory computer readable storage medium;
  first program instructions to present a graphical user interface (GUI) to a user, said GUI displays a hierarchical menu driven interface;
  second program instructions code instructions to receive iteratively a plurality of user instructions indicated by said user using said hierarchical menu driven interface, for creating a logical sequence of hand poses and hand motions constructing at least one hand gesture by defining at least one of a plurality of hand pose features records and a plurality of hand motion features records; and
  third program instructions code instructions to generate a software code segment describing said at least one hand gesture by defining said at least one hand pose features record through at least one of a plurality of discrete pose values and said at least one hand motion features record through at least one of a plurality of discrete motion values;
  wherein said generated software code segment is adapted to be executed by at least one application for implementing a gesture Human Machine Interface (HMI); and
  wherein said first, second and third program instructions are executed by at least one computerized processor from said non-transitory computer readable storage medium.

17. The software program product of claim 16, wherein each of said discrete pose values is indicative of a corresponding one of a plurality of hand pose features and each of said discrete motion values is indicative of a corresponding one of a plurality of hand motion features.

18. The software program product of claim 17, wherein said hand pose feature is a member selected from a group consisting of: active hand, palm direction, palm rotation, flexion of at least one finger, direction of at least one finger, relative location between at least two fingers and tangency between at least two fingers.

19. The software program product of claim 17, wherein said hand motion feature is a member selected from a group consisting of: motion properties and motion script, said motion script defines at least one of: hand motion and motion of at least one finger.

20. The software program product of claim 16, wherein said logical sequence which represents said at least one hand gesture is defined by a unique finite state machine model.

21. The software program product of claim 16, further comprising said code segment conforms to a gesture application user interface (API).

22. The software program product of claim 16, further comprising said GUI displays said logical sequence so that each of said at least one hand pose features record and said at least one hand motion features record is assigned with a construction area which is displayed with an associated instance of said hierarchical menu driven interface.

23. The software program product of claim 22, further comprising said associated instance is a hierarchical arc menus structure comprising a plurality of menus shaped as arcs each having at least one of a plurality of feature fields, said hierarchical arc menus structure having at least one of a plurality of levels:
  a first level arc menu which is displayed by said GUI adjacent to said construction area; and
  at least one of a plurality of next level arc menus, each of said plurality of next level arc menus is adjacent to a respective previous level arc menu and having a larger radius from a center of said construction area;
  wherein each of said plurality of feature fields is associated with a gesture feature which is assigned at least one of: said plurality of discrete pose values and said plurality of discrete motion values.

24. The software program product of claim 23, wherein said each next level arc menu is presented by said GUI following an indication in said at least one field of said previous level arc menu, said indication is made by said user.

25. The software program product of claim 23, further comprising said at least one feature field is actively displayed to indicate availability of said associated gesture creation operation.

* * * * *